(12) United States Patent
Olson et al.

(10) Patent No.: US 7,610,932 B2
(45) Date of Patent: *Nov. 3, 2009

(54) FLUIDIC CARTRIDGES AND END PIECES THEREOF

(75) Inventors: Judd Dylan Olson, Minnetonka, MN (US); David James Emmons, Plymouth, MN (US); John Paul Boros, Maple Lake, MN (US); Donald Stephen Bretl, West Chester, OH (US); Alan Joseph Mitchell, Evansville, IN (US); Todd L Rose, Evansville, IN (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 11/291,385

(22) Filed: Dec. 1, 2005

(65) Prior Publication Data

US 2006/0081805 A1 Apr. 20, 2006

Related U.S. Application Data

(63) Continuation of application No. 10/424,200, filed on Apr. 25, 2003, now Pat. No. 7,000,894.

(51) Int. Cl.
*F16L 29/02* (2006.01)
(52) U.S. Cl. .................. 137/594; 251/149.1; 251/251
(58) Field of Classification Search ............... 137/594, 137/595, 614–614.06; 251/149.1, 149.6, 251/149.9, 251, 262, 263, 257; 141/346; 210/440, 431
See application file for complete search history.

(56) References Cited

U.S. PATENT DOCUMENTS

| 1,020,212 | A | | 3/1912 | Lukowski |
| 2,056,756 | A | | 10/1936 | Wiedhofft |
| 2,107,165 | A | | 2/1938 | Rice |
| 2,158,347 | A | | 5/1939 | Yirava |
| 2,240,648 | A | | 5/1941 | Hartman |
| 2,382,278 | A | | 8/1945 | Widmann |
| 2,468,618 | A | * | 4/1949 | Dinesen .................. 251/149.3 |
| 2,544,244 | A | | 3/1951 | Vokes |
| 2,563,548 | A | | 8/1951 | Plante |
| 2,568,181 | A | | 9/1951 | Zimmerman et al. |
| 2,681,572 | A | | 6/1954 | Lamb |
| 2,790,572 | A | | 4/1957 | Flaith et al. |

(Continued)

FOREIGN PATENT DOCUMENTS

DE 24 53 445 5/1976

(Continued)

*Primary Examiner*—Stephen Hepperle
*Assistant Examiner*—Andrew J Rost
(74) *Attorney, Agent, or Firm*—Kirk W. Goodwin

(57) ABSTRACT

In the treatment of water, an end piece is connected to a treatment cartridge housing and inserted into an appliance having bypass, inlet, and outlet valves. The end piece has an end piece wall from which an inlet fitting, outlet fitting, and protrusion extend. The inlet fittings, outlet fittings, protrusion, and cartridge housing each have a longitudinal axis. The inlet and outlet fittings have a cam surface for actuating the inlet and outlet valves, respectively. Further, the cam surfaces of the inlet and outlet fittings are angled and vectored in relation to their respective longitudinal axis. The protrusion is shaped for actuating the bypass valve.

21 Claims, 26 Drawing Sheets

U.S. PATENT DOCUMENTS

| | | | |
|---|---|---|---|
| D188,688 S | 8/1960 | Sicard | |
| 2,979,208 A | 4/1961 | Humbert, Jr. | |
| 3,105,042 A | 9/1963 | Roosa | |
| 3,217,942 A | 11/1965 | Humbert, Jr. et al. | |
| 3,228,413 A * | 1/1966 | Stevens, Jr. | 137/322 |
| 3,237,770 A | 3/1966 | Humbert, Jr. | |
| 3,266,628 A | 8/1966 | Price | |
| 3,306,451 A | 2/1967 | Kudlaty | |
| 3,313,417 A | 4/1967 | Rosaen | |
| 3,313,418 A | 4/1967 | Rosaen | |
| 3,319,791 A | 5/1967 | Horne | |
| 3,333,697 A | 8/1967 | Rosaen | |
| 3,333,703 A | 8/1967 | Scavuzzo et al. | |
| 3,342,340 A | 9/1967 | Shindell | |
| 3,347,386 A | 10/1967 | Kraissl, Jr. | |
| 3,358,839 A | 12/1967 | Simons | |
| 3,360,910 A | 1/1968 | Soltis | |
| 3,383,841 A | 5/1968 | Olson et al. | |
| 3,392,837 A | 7/1968 | Sanzenbacher | |
| 3,399,776 A | 9/1968 | Knuth | |
| 3,423,908 A | 1/1969 | Hart | |
| 3,426,512 A | 2/1969 | Nesher | |
| 3,426,998 A | 2/1969 | Kintner | |
| 3,434,269 A | 3/1969 | Hyatt | |
| 3,447,558 A | 6/1969 | Cserny | |
| 3,470,679 A | 10/1969 | Ramsey | |
| 3,497,071 A | 2/1970 | Mineo | |
| 3,540,594 A | 11/1970 | Sanderson | |
| 3,556,300 A | 1/1971 | Codo | |
| D220,263 S | 3/1971 | Hughes | |
| D221,850 S | 9/1971 | Anderson | |
| 3,715,032 A | 2/1973 | Nicko | |
| 3,729,905 A | 5/1973 | Diccianni | |
| 3,746,171 A | 7/1973 | Thomsen | |
| 3,777,889 A | 12/1973 | Henderson | |
| 3,852,196 A | 12/1974 | Szpur | |
| 3,859,216 A | 1/1975 | Sisson et al. | |
| 3,909,221 A | 9/1975 | Bengtsson et al. | |
| 3,950,251 A | 4/1976 | Hiller | |
| 3,954,624 A | 5/1976 | Petrucci | |
| D243,767 S | 3/1977 | Rutherford | |
| 4,051,036 A | 9/1977 | Conrad et al. | |
| 4,052,307 A | 10/1977 | Humbert, Jr. | |
| 4,077,876 A | 3/1978 | Southall | |
| 4,082,673 A | 4/1978 | Cilento | |
| 4,094,779 A | 6/1978 | Behrman | |
| 4,105,561 A | 8/1978 | Domnick | |
| D251,380 S | 3/1979 | Casamitjana | |
| 4,222,875 A | 9/1980 | Sikula, Jr. | |
| 4,268,384 A | 5/1981 | Rosaen et al. | |
| 4,303,514 A | 12/1981 | Theorell | |
| 4,304,736 A | 12/1981 | McMillin et al. | |
| 4,349,438 A | 9/1982 | Sims | |
| 4,371,439 A | 2/1983 | Thornton | |
| 4,379,053 A | 4/1983 | Brane | |
| 4,434,903 A | 3/1984 | Cooke | |
| 4,446,987 A | 5/1984 | White | |
| 4,460,156 A * | 7/1984 | Hazelrigg et al. | 251/149.3 |
| 4,465,595 A | 8/1984 | Cooper | |
| 4,483,368 A * | 11/1984 | Panthofer | 137/614.04 |
| 4,495,072 A | 1/1985 | Fields | |
| 4,497,348 A | 2/1985 | Sedam | |
| 4,505,823 A | 3/1985 | Klein | |
| 4,515,692 A | 5/1985 | Chandler et al. | |
| 4,520,950 A | 6/1985 | Jeans | |
| 4,529,050 A | 7/1985 | Mosher et al. | |
| 4,529,514 A | 7/1985 | Gruett | |
| 4,529,515 A | 7/1985 | Selz | |
| 4,559,136 A * | 12/1985 | Dockery | 210/235 |
| 4,571,953 A | 2/1986 | Caruso | |
| 4,615,812 A | 10/1986 | Darling | |
| 4,617,118 A | 10/1986 | Smart | |
| 4,637,874 A | 1/1987 | Ansteth | |
| 4,645,601 A | 2/1987 | Regunathan et al. | |
| 4,684,471 A | 8/1987 | Manojlovic | |
| 4,719,012 A | 1/1988 | Groezinger et al. | |
| 4,731,183 A | 3/1988 | Schumacher, II | |
| 4,735,716 A | 4/1988 | Petrucci et al. | |
| 4,764,275 A | 8/1988 | Robichaud | |
| 4,806,240 A | 2/1989 | Giordano et al. | |
| 4,877,521 A | 10/1989 | Petrucci et al. | |
| 4,915,831 A | 4/1990 | Taylor | |
| 4,948,503 A | 8/1990 | Baumann et al. | |
| 4,948,505 A | 8/1990 | Petrucci et al. | |
| D322,836 S | 12/1991 | Petrucci et al. | |
| 5,083,442 A | 1/1992 | Vlock | |
| 5,098,559 A | 3/1992 | Mack et al. | |
| 5,102,543 A | 4/1992 | Burroughs | |
| 5,108,598 A | 4/1992 | Posner | |
| 5,135,645 A | 8/1992 | Sklenak et al. | |
| 5,186,830 A | 2/1993 | Rait | |
| 5,256,285 A | 10/1993 | Tomita et al. | |
| 5,273,255 A | 12/1993 | Klicek et al. | |
| 5,320,752 A | 6/1994 | Clack et al. | |
| 5,336,406 A | 8/1994 | Stanford et al. | |
| 5,354,464 A | 10/1994 | Slovak et al. | |
| 5,397,462 A | 3/1995 | Higashijima et al. | |
| 5,397,468 A | 3/1995 | Chomka et al. | |
| 5,456,830 A | 10/1995 | Stanford et al. | |
| 5,460,719 A * | 10/1995 | Clack et al. | 210/233 |
| 5,468,386 A | 11/1995 | Ardes | |
| 5,486,288 A | 1/1996 | Stanford et al. | |
| 5,501,791 A | 3/1996 | Theisen et al. | |
| 5,503,740 A | 4/1996 | Callaghan et al. | |
| 5,516,425 A | 5/1996 | Brieden et al. | |
| 5,520,801 A | 5/1996 | Gerber et al. | |
| 5,527,451 A | 6/1996 | Hembree et al. | |
| 5,560,824 A | 10/1996 | Sann et al. | |
| 5,589,060 A | 12/1996 | Gebert et al. | |
| 5,591,332 A | 1/1997 | Reid et al. | |
| 5,607,582 A | 3/1997 | Yamazaki et al. | |
| 5,611,923 A | 3/1997 | Suri et al. | |
| 5,681,475 A | 10/1997 | Lamensdorf et al. | |
| 5,688,396 A | 11/1997 | Baumann et al. | |
| 5,698,093 A | 12/1997 | Pyle et al. | |
| 5,698,098 A | 12/1997 | Ernst et al. | |
| 5,700,371 A | 12/1997 | Koslow | |
| 5,725,623 A | 3/1998 | Bowerman et al. | |
| 5,744,030 A | 4/1998 | Reid et al. | |
| 5,753,107 A | 5/1998 | Magnusson et al. | |
| 5,753,111 A | 5/1998 | Patton et al. | |
| 5,762,787 A * | 6/1998 | Park et al. | 210/232 |
| 5,785,848 A | 7/1998 | Strand | |
| 5,826,854 A | 10/1998 | Janvrin et al. | |
| 5,846,417 A | 12/1998 | Jiang et al. | |
| 5,858,227 A | 1/1999 | Stone et al. | |
| 5,914,037 A | 6/1999 | Yen | |
| 5,925,025 A | 7/1999 | Weilbacher et al. | |
| 5,925,245 A | 7/1999 | Bradford et al. | |
| 5,928,504 A | 7/1999 | Hembre et al. | |
| 6,024,869 A | 2/2000 | Stifelman | |
| 6,027,644 A | 2/2000 | Magnusson et al. | |
| D423,081 S | 4/2000 | Niermeyer | |
| 6,068,770 A | 5/2000 | Niermeyer et al. | |
| 6,090,283 A | 7/2000 | Schumann et al. | |
| 6,120,685 A | 9/2000 | Carlson et al. | |
| 6,129,841 A | 10/2000 | Dann | |
| 6,193,884 B1 | 2/2001 | Magnusson et al. | |
| 6,224,754 B1 | 5/2001 | Schiavon et al. | |
| RE37,216 E | 6/2001 | Koslow | |
| 6,303,031 B1 | 10/2001 | Senner | |
| 6,337,015 B1 | 1/2002 | Poirier | |
| 6,355,177 B2 | 3/2002 | Senner et al. | |
| 6,360,764 B1 | 3/2002 | Fritze | |

| | | | | | | |
|---|---|---|---|---|---|---|
| 7,000,894 B2 * | 2/2006 | Olson et al. ............... 251/149.1 | GB | 2 018 956 A | 10/1979 |
| 7,147,773 B2 * | 12/2006 | Mitchell et al. ............. 210/234 | GB | 2 021 445 A | 12/1979 |
| 2001/0045386 A1 | 11/2001 | Stankowski et al. | GB | 2 045 102 A | 10/1980 |
| 2002/0017497 A1 | 2/2002 | Fritze | GB | 2 061 122 A | 5/1981 |
| 2002/0020661 A1 | 2/2002 | Jainek | GB | 2062810 | 5/1981 |
| 2002/0023614 A1 | 2/2002 | Hartmann et al. | GB | 2 088 021 A | 6/1982 |
| 2002/0023863 A1 | 2/2002 | Binder et al. | GB | 2 099 111 A | 12/1982 |
| 2002/0036162 A1 | 3/2002 | Magnusson et al. | GB | 2 132 499 A | 7/1984 |
| 2002/0043491 A1 | 4/2002 | Janik et al. | GB | 2 139 247 A | 11/1984 |

FOREIGN PATENT DOCUMENTS

| | | | | | |
|---|---|---|---|---|---|
| DE | 2456428 A1 | 8/1976 | GB | 2 162 079 A | 1/1986 |
| DE | 3048219 A1 | 7/1982 | GB | 2 188 399 A | 9/1987 |
| DE | 3122047 A1 | 12/1982 | GB | 2 206 292 A | 1/1989 |
| DE | 3409219 | 9/1985 | GB | 2 208 068 A | 2/1989 |
| DE | 3432855 A1 | 3/1986 | GB | 2 230 473 A | 10/1990 |
| DE | 3446772 A1 | 7/1986 | GB | 2 230 589 A | 10/1990 |
| DE | 3538589 A1 | 5/1987 | GB | 2 233 068 A | 1/1991 |
| DE | 3622153 | 8/1987 | GB | 2 233 727 A | 1/1991 |
| DE | 3903675 | 8/1990 | GB | 2 312 383 A | 10/1997 |
| DE | 4023753 | 1/1992 | IT | 678800 | 12/1964 |
| DE | 43 24 158 A1 | 1/1994 | JP | 404083578 A | 3/1992 |
| DE | 4408888 | 9/1994 | WO | WO 92/05856 | 4/1992 |
| DE | 43 31 598 A1 | 3/1995 | WO | WO 92/12784 | 8/1992 |
| DE | 4330839 | 3/1995 | WO | WO 92/18218 | 10/1992 |
| DE | 4331467 | 3/1995 | WO | WO 93/13847 | 7/1993 |
| DE | 4411279 | 10/1995 | WO | WO 95/07745 | 3/1995 |
| DE | 296 10 290 U1 | 8/1996 | WO | WO 95/13468 | 5/1995 |
| DE | 299 22 324 U1 | 5/2001 | WO | WO 95/27574 | 10/1995 |
| EP | 0 040 133 A2 | 11/1981 | WO | WO 96/06668 | 3/1996 |
| EP | 0 079 841 B1 | 5/1983 | WO | WO 96/37274 | 11/1996 |
| EP | 0 408 375 A2 | 1/1991 | WO | WO 97/26066 | 7/1997 |
| EP | 0 319 518 B1 | 5/1993 | WO | WO 98/05408 | 2/1998 |
| EP | 0 937 868 A1 | 8/1999 | WO | WO 98/17371 | 4/1998 |
| EP | 1 008 375 A1 | 6/2000 | WO | WO 99/37375 | 7/1999 |
| EP | 1 058 000 A2 | 12/2000 | WO | WO 99/37908 | 7/1999 |
| EP | 1 106 795 A1 | 6/2001 | WO | WO 99/65589 | 12/1999 |
| EP | 1 136 110 A2 | 9/2001 | WO | WO 00/20093 | 4/2000 |
| FR | 2 684 738 | 6/1993 | WO | WO 01/80967 A1 | 1/2001 |
| FR | 2 779 661 | 12/1999 | WO | WO 01/17654 A1 | 3/2001 |
| GB | 450490 | 7/1936 | WO | WO 01/17657 A2 | 3/2001 |
| GB | 541488 | 11/1941 | WO | WO 01/19494 A1 | 3/2001 |
| GB | 841603 | 7/1960 | WO | WO 01/23819 A1 | 4/2001 |
| GB | 915760 | 1/1963 | WO | WO 01/30480 A1 | 5/2001 |
| GB | 944384 | 12/1963 | WO | WO 01/39859 A1 | 6/2001 |
| GB | 982548 | 2/1965 | WO | WO 01/64312 A1 | 9/2001 |
| GB | 1025981 | 4/1966 | WO | WO 01/83079 A1 | 11/2001 |
| GB | 1 239 068 | 7/1971 | WO | WO 01/91881 A2 | 12/2001 |
| GB | 1 296 051 | 11/1972 | WO | WO 01/92714 A2 | 12/2001 |
| GB | 1427031 | 3/1976 | WO | WO 02/05926 A1 | 1/2002 |
| | | | WO | WO 02/11854 A1 | 2/2002 |

* cited by examiner

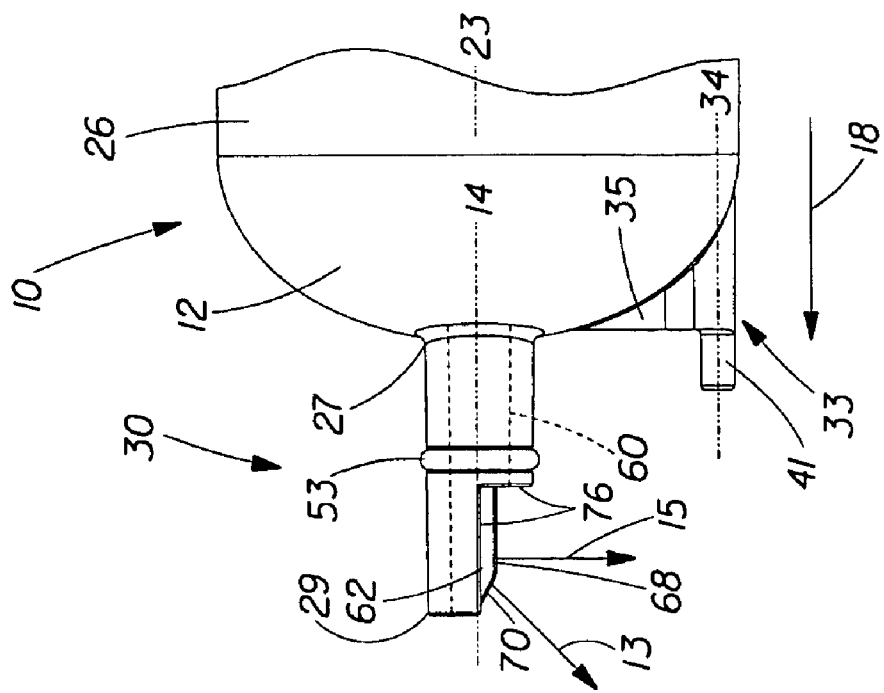
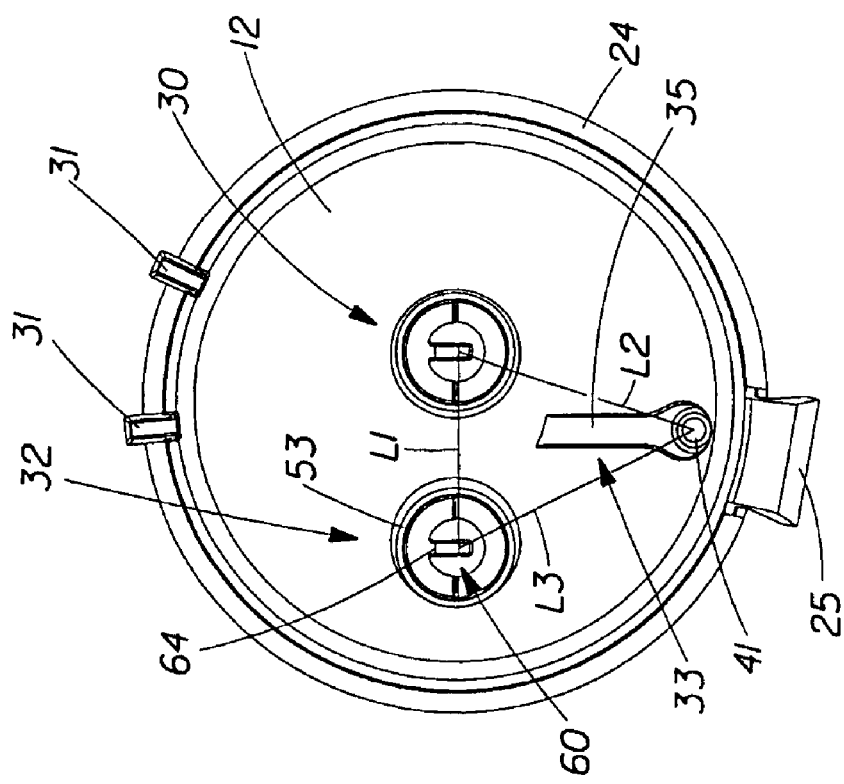

FLUIDIC CARTRIDGES AND END PIECES THEREOF

CROSS REFERENCE TO RELATED APPLICATION

This is a continuation application of U.S. patent application Ser. No. 10/424,200, filed Apr. 25, 2003.

TECHNICAL FIELD OF THE INVENTION

The present invention relates to the field of fluid treatment, and more particularly to the field of fluidic cartridges and the end pieces thereof that are capable of actuating one or more valves of an appliance.

BACKGROUND OF THE INVENTION

Water treatment cartridges are known in the art. Examples of some cartridges are disclosed in U.S. Pat. Nos. 5,826,854, 6,120,685, and 6,337,015. These cartridges have an inlet, an outlet, and a filter material in fluid communication with the inlet and the outlet. Some of these cartridges open a valve in the inlet and/or the outlet of a head assembly fitting to which the cartridge attaches. Examples of such arrangements are disclosed in U.S. Pat. Nos. 5,256,285, 5,607,582, and 5,753,111. These valves are typically actuated in a direction linear with the engagement of the filter cartridge, requiring the appliance casing receiving the cartridge to be at least as long as the valve. Some known cartridges can be used to actuate valves other than an inlet and/or an outlet valve. For example, U.S. Pat. Nos. 3,399,776 and 3,852,196 disclose a filter and valve arrangement whereby connecting or disconnecting the filter cartridge from the inlet/outlet valves of the system's body also automatically opens or closes a bypass valve.

While these cartridges may have been useful for their intended purpose, there is a desire to provide a more compact treatment cartridge arrangement that can actuate inlet and outlet valves when inserted into a confined space. Additionally, there is a desire to maximize the length of treatment cartridges, thus increasing treatment material, thus increasing cartridge performance in confined spaces. Further, there is a desire to provide a treatment cartridge that utilizes a mechanical advantage in actuating an inlet and/or an outlet valve. Still further, there is a desire to provide a treatment cartridge that can accomplish any of the foregoing and is also capable of actuating a bypass valve (or other feature) located on the head assembly into which the cartridge is inserted.

SUMMARY OF THE INVENTION

Generally, in one embodiment, the invention is directed to an end piece that may be used with an appliance having inlet, outlet, and bypass valves which are typically arranged in a head assembly. More specifically, certain embodiments of the invention comprise an end piece that includes an end piece wall, an inlet fitting having a longitudinal axis and a cam surface for actuating the inlet valve, and an outlet fitting having a longitudinal axis. The inlet and outlet fittings extend from the end piece wall. The cam surface is vectored in relation to the longitudinal axis of the inlet fitting.

In another embodiment, the invention is directed to a cartridge which includes an end piece as described above and a cartridge housing connected thereto. The end piece includes an end piece wall, an inlet fitting, and an outlet fitting. The inlet fitting has a longitudinal axis and a cam surface for actuating the inlet valve, and an outlet fitting having a longitudinal axis. The cartridge housing includes a first end, a closed second end, and a longitudinal axis extending therebetween. The end piece is connected to the first end of the cartridge by the end piece wall. The inlet and outlet fittings extend from the end piece wall. Also, the cam surface of the inlet fitting is vectored in relation to the longitudinal axis of the inlet fitting, the longitudinal axis of the outlet fitting, or the longitudinal axis of the cartridge housing.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

FIG. 2-B is a top plan view of the end piece of the cartridge of FIG. 1.

FIG. 2-C is a side elevational view of the end piece of the cartridge of FIG. 1.

FIG. 9-B is a cross sectional top plan view of the head assembly and partially inserted end piece of the cartridge of FIG. 1 taken along line 9A/B-9A/B thereof, wherein the inlet valve is not actuated and shown in the closed position.

FIG. 12-B is a cross sectional view of the bypass valve of the head assembly of FIG. 1 taken along line 12A/B-12A/B thereof, wherein the bypass valve is shown in the open position.

FIG. 14-B is a perspective view of a cartridge of FIG. 1 partially inserted and unlatched from an appliance casing.

FIG. 15-B is a perspective view of the appliance button of FIG. 15-A, showing the button wall.

FIG. 16-B is a perspective view of the cartridge of FIG. 1 after insertion into the head assembly of FIG. 1 which is positioned behind the front grill of a refrigerator.

FIG. 18-B is a side elevational view of an alternate embodiment of the end piece of the cartridge of FIG. 1, wherein the position of the fittings and protrusion is altered, and the fittings further include a deflector wall.

FIG. 18-C is a perspective view of an alternate embodiment of the end piece of the cartridge of FIG. 1, wherein the position of the fittings and protrusion is altered, and the fittings further include a deflector wall.

DESCRIPTION OF THE PREFERRED EMBODIMENTS

Figure 1:
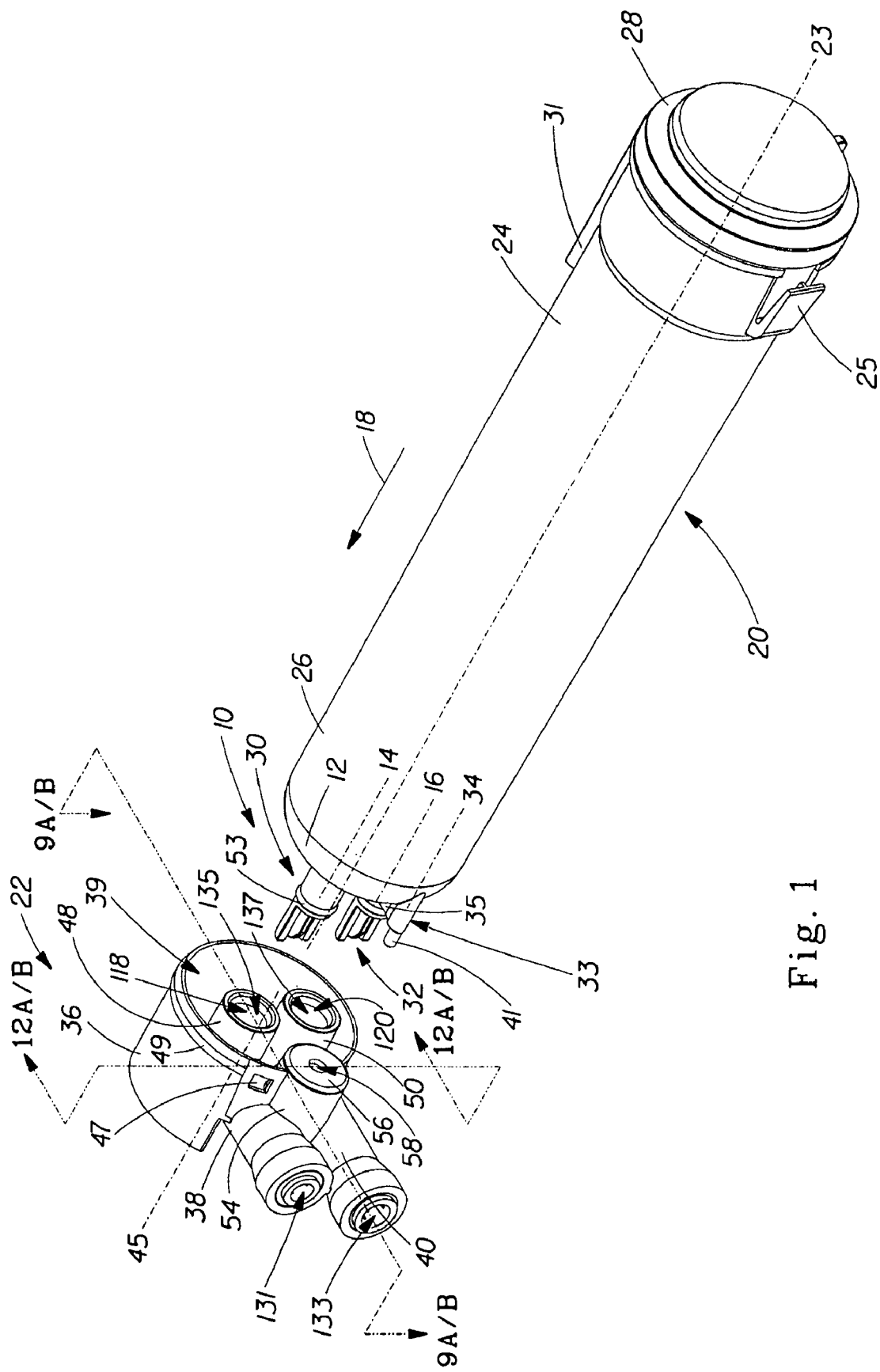
FIG. 1 is an exploded perspective view of a cartridge and a head assembly, the cartridge being aligned for insertion into the head assembly, according to the present invention.

As used herein, the term "longitudinal axis" refers to the axis running along the length and through the center of the referenced object.

As used herein, the term "fluid" refers to a gas or liquid.

As used herein, the term "sealing surface" refers to a surface capable of forming a barrier to the flow of a fluid.

As used herein, the term "distal" refers to the area situated in a direction away from the end piece wall.

As used herein, the term "proximal" refers to the area situated in a direction nearest to the end piece wall.

As used herein, the term "actuate" refers to mechanical action or motion and/or maintaining a position against a force (e.g., moving a follower or holding a follower in an open position).

As used herein, the term "cam surface" refers to the sum of all surfaces that physically touch a follower of a valve for the purpose of actuating the valve.

As used herein, the term "angled" is intended to mean that at least a portion of the cam surface is not parallel with a referenced line or axis. The cam surface or portion thereof might have a constant angle such as present in a straight surface, or a variable angle such as present in a curved surface, or a combination thereof.

As used herein, the term "vector" refers to an imaginary line that is perpendicular to a cam surface or portion thereof and represents the orientation in which the cam surface or portion thereof faces.

As used herein, the term "vectored" refers to a cam surface or a portion thereof having a vector with a radial component some degree from a referenced line or axis (i.e., a vector which at least partially diverges radially some degree from a referenced line or axis). A vectored cam surface radially faces away to some degree from a referenced line or axis (which is generally the longitudinal axis of a fitting). A vectored cam surface or portion thereof can have a vector which extends only in a radial or transverse direction, that is, 90 degrees in relation to the referenced line or axis (herein referred to as "fully vectored") or a vectored cam surface or portion thereof can have a radial or transverse component, that is, greater than about 1 degree and less than about 90 degrees in relation to the referenced line or axis (herein referred to as "partially vectored").

As used herein, the term "leading portion" refers to the first place of contact of a cam surface and a follower of a valve.

Reference will now be made in detail to the present preferred embodiments of the invention, examples of which are illustrated in the accompanying drawings. Numerals with the same last three digits represent the same or similar elements throughout the figures (e.g., 122, 1122, 2122, or 020, 1020, 2020). As will be appreciated, the present invention is directed to cartridges and end pieces thereof that actuate one or more valves and other features on a head assembly into which an end piece is received. A head assembly is typically located in an appliance which utilizes water, such as a refrigerator icemaker or water port, water stand or cooler, clothing washer, faucet, spigot, coffee maker, dishwasher, or any other appliance that might utilize a water treatment cartridge for delivering potable water. Cartridges and end pieces thereof of the present invention can be used with fluids, although liquids such as water are the preferred application. A specific example of the preferred embodiment includes inserting an end piece attached to a cartridge housing containing a water treatment material into a refrigerator having a head assembly so that fluid communication between refrigerator water and the treatment material results in potable (or more potable) water via the treatment of previously untreated water.

Figure 2C:
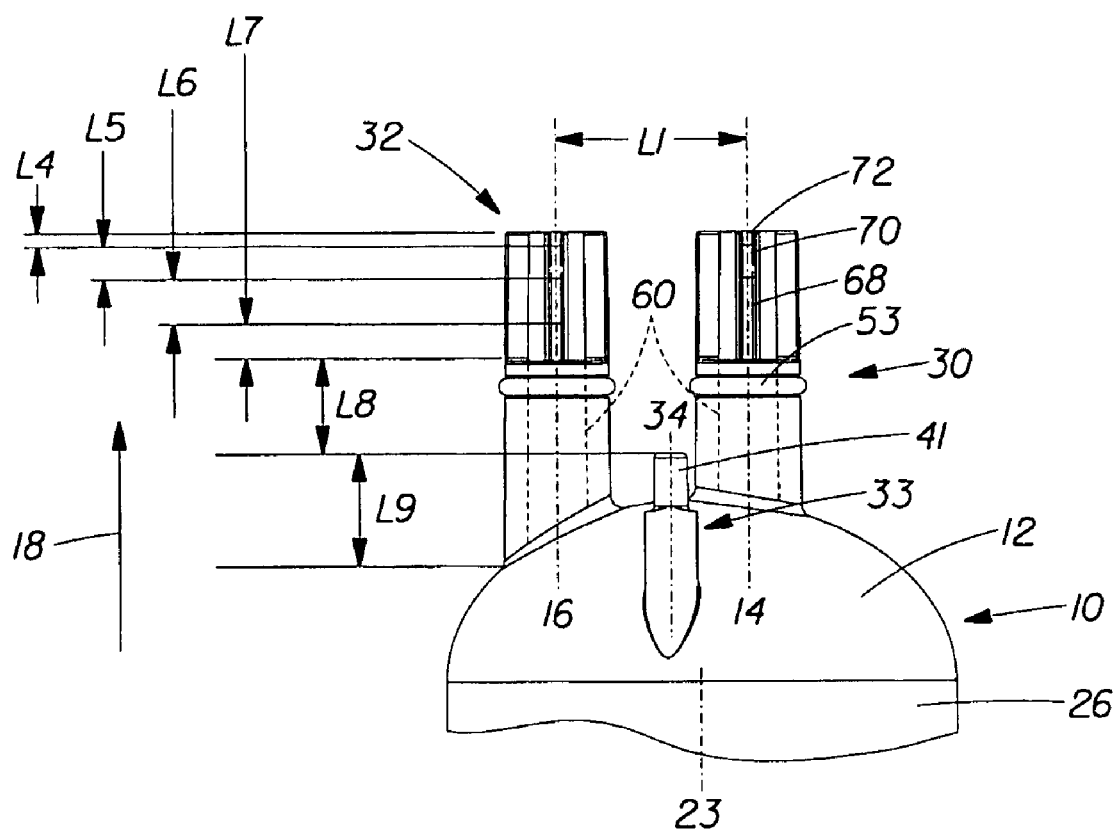
FIG. 2-A is a front elevational view of the cartridge of FIG. 1.
Figure 3:
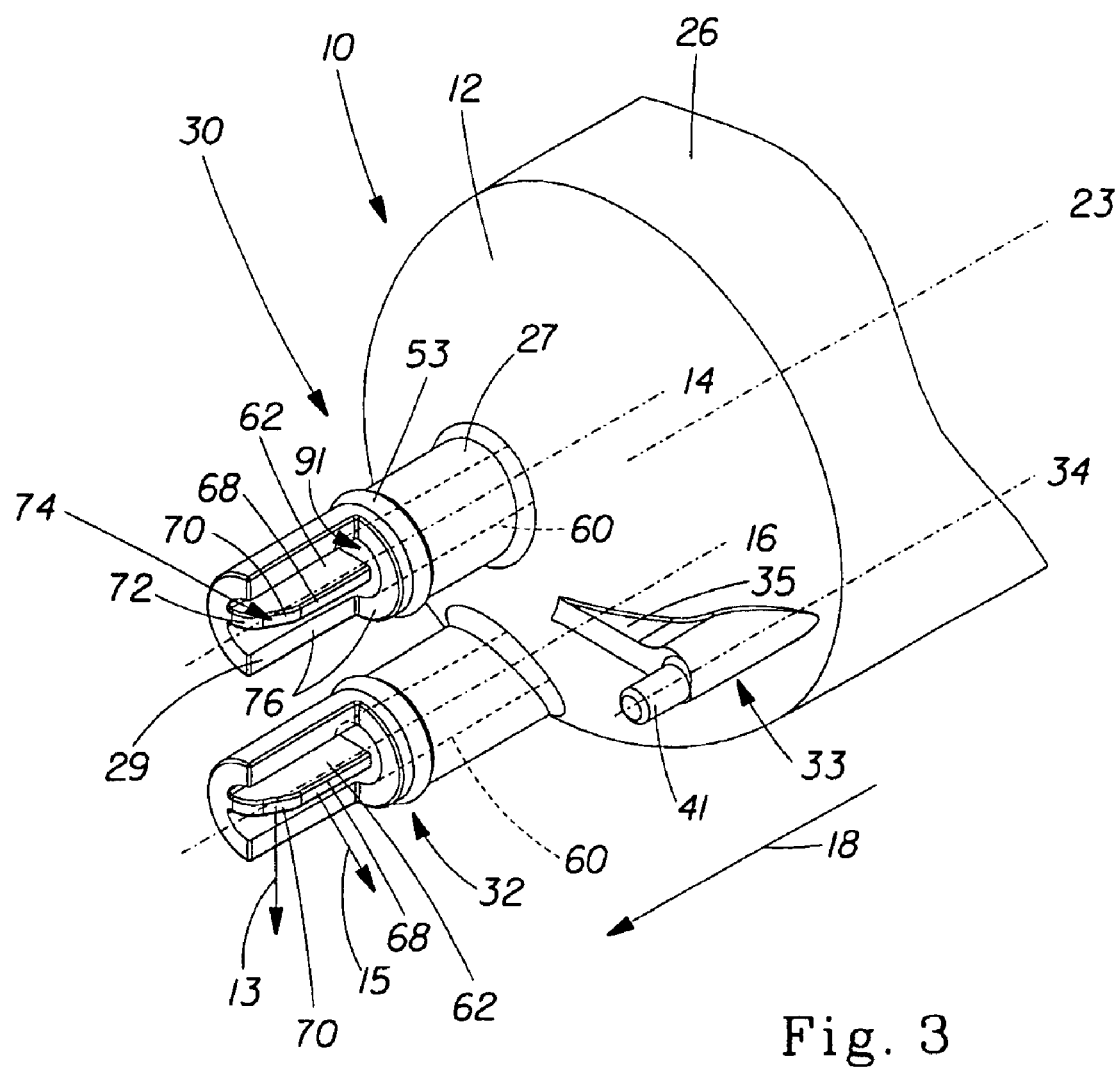
FIG. 3 is a perspective view of the end piece of the cartridge of FIG. 1.

Referring to FIGS. 1 and 2-A, B, and C, a cartridge 20 (preferably having a length from about 20 cm, about 25 cm, about 30 cm to about 35 cm, about 40 cm, about 45 cm) comprising an end piece 10 connected to a cartridge housing 24 (preferably having a length from about 15 cm, about 20 cm, about 25 cm to about 30 cm, about 35 cm, about 40 cm, and preferably having a diameter from about 1 cm, about 3 cm, about 5 cm to about 10 cm, about 13 cm, about 15 cm) will now be generally described. The end piece 10 includes an end piece wall 12, an inlet fitting 30, an outlet fitting 32, and a protrusion 33. In the preferred embodiment, the end piece 10 is molded together with the cartridge housing 24 to form a cartridge 20. It should be understood that the end piece 10 may be permanently connected (e.g., molded, adhesively bonded, soldered, welded, hot plate welded, etc.) or releasably connected (e.g., friction fitted, threadably fitted, bolted, screwed, fastened, snap fitted, latched, etc.) to the cartridge housing 24. The end piece 10 may be made of various materials for overcoming pressures within the head assembly 22 including, but not limited to, plastic and polymers thereof, metal and alloys thereof, fiberglass, etc. The cartridge housing 24 may be cylindrical and hollow, having a first end 26 and a closed end 28 opposite the first end 26. The housing 24 may optionally be structurally reinforced by ribs or the like. While the end piece 10 of the preferred embodiment is situated at the first end 26 of the housing 24, it is anticipated that the end piece 10 is not limited to attachment to an end of a cartridge housing (e.g., 24), but may also be inserted, for example, to the end of a commercially available cartridge, discussed infra.

The inlet fitting 30 and the outlet fitting 32 extend from the end piece wall 12 such that the inlet fitting 30 is more in-line with the center axis of the cartridge 20, closer to the center of the end piece wall 12 while the outlet fitting 32 is further from the center axis of the cartridge 20, on the periphery of the end piece wall 12. It is anticipated that the inlet and outlet fittings 30 and 32 may be reversed, or otherwise arranged. That is, the particular configuration of treatment material (not shown) may dictate the placement of the fittings 30 and 32 in any of several configurations. Each fitting 30 and 32 has a longitudinal axis 14 and 16, respectively. The longitudinal axis 14 and 16 of the fittings 30 and 32 may lie together in only one plane. Also, the solid protrusion 33 may have a cylindrical end 41 (preferably having a length from about 0.1 cm, about 0.3 cm, about 0.5 cm to about 1 cm, about 1.5 cm, about 2 cm, and preferably having a diameter from about 0.1 cm, about 0.2 cm, about 0.3 cm to about 0.5 cm, about 0.7 cm, about 1 cm) extends from near the edge of the end piece wall 12, adjacent to the connection of the end piece 10 and cartridge 20. The protrusion 33 has a longitudinal axis 34. The longitudinal axis 14 of the inlet fitting 30, the longitudinal axis 16 of the outlet fitting 32, the longitudinal axis 34 of the protrusion 33, and the longitudinal axis 23 of the cartridge 20 may be parallel with a line of cartridge 20 insertion 18 into the head assembly 22, as in the preferred embodiment. Further, the protrusion 33 is positioned, relative to a side view along the line of insertion 18 of the end piece 10 (e.g., FIG. 2-C), between the inlet fitting 30 and the outlet fitting 32 (i.e., no part of the protrusion end 41, relative to the side view of FIG. 2-C, exceeds the outer most portion of the inlet or outlet fittings 30 or 32). As shown in FIG. 2-A, the distance L1 (preferably from about 0.2 cm, about 0.5 cm, about 0.8 cm to about 2 cm, about 4 cm, about 5 cm) from the longitudinal axis 14 of the inlet fitting 30 to the longitudinal axis 16 of the outlet fitting 32 is less than the distance L2 (preferably from about 0.5 cm, about 0.7 cm, about 1 cm, about 2 to about 3 cm, about 5 cm, about 6 cm) from the longitudinal axis 14 of the inlet fitting 30 to the longitudinal axis 34 of the protrusion 33. Further, as shown in FIG. 2-A, the distance L2 from the longitudinal axis 14 of the inlet fitting 30 to the longitudinal axis 34 of the protrusion 33 is less than the distance L3 (preferably from about 0.7 cm, about 1 cm, about 1.5 cm, about 2 to about 3 cm, about 6 cm, about 7 cm) from the longitudinal axis 16 of the outlet fitting 32 to the longitudinal axis 34 of the protrusion 33. As mentioned above, the inlet and outlet fittings 30 and 32 may be reversed or otherwise arranged, such that the distance L2 would be greater than the distance L3.

The protrusion 33 extends approximately one half the distance of the fittings 30 and 32 from the end piece wall 12. It is the positioning of the protrusion 33 on the end piece 10 that allows for the protrusion 33 to be rigidly supported by a support bridge 35. While the protrusion 33 of the preferred embodiment is solid, it is anticipated that the protrusion 33 may also be entirely or partially hollow. As will be later discussed, the size and possibilities of different arrangements of the inlet and outlet fittings 30 and 32 and the protrusion 33 contribute to the compactness of the head assembly 22. An outwardly biased latch 25 is disposed on the outer surface of the hollow housing 24 just before the second end 28. The latch 25 is capable of being releasably engaged by an appliance, as described in more detail below. As shown in FIG. 2-A, opposite the latch 25, on the outer surface of the hollow housing 24 are two guide rails 31 which run along the longitudinal axis 23 of the cartridge 20 approximately one quarter the length of the cartridge 20. A treatment material (not shown) is disposed within the interior space of the housing 24 and is in fluid communication with the inlet fitting 30 and the outlet fitting 32.

The treatment material (not shown) can provide a variety of functions as known in the art, including, but not limited to, the removal or neutralization of contaminants such as by size exclusion, electrolysis, absorption, adsorption, oxidation, reduction, chemical disinfection, ion exchange, etc. Examples of contaminants include microorganisms, viruses, bacteria, pathogens, protozoa, organic matter, inorganic material, etc. Also, beneficial additives such as flavorants, vitamins, minerals, nutrients, etc. may also be added. Examples of suitable treatment materials known in the art are described in U.S. Pat. Nos. 2,167,225, 2,335,458, 4,172,796, 4,493,772, 4,764,274, 4,025,438, 4,094,779, and 6,337,015. For example, treatment materials may include, but are not limited to, one or a combination of carbon (e.g., activated carbon, such as a tube of porous carbon, or a block of porous carbon, or carbon powder sintered with a plastic binder or the like), ion exchange media (e.g., in the form of resin beads, flat filtration membranes, fibrous filtration structures, etc.), zeolite particles or coatings (e.g., silver loaded), polyethylene, or charge-modified melt-blown or micro-fiber glass webs, alumina, diatomaceous earth, etc. It should be understood that the treatment materials of this invention may comprise other conventional water treatment materials known in the art, including those described in EPO 0 402 661 published Dec. 19, 1990.

Referring to FIGS. 2-A, B, and C and 3, the inlet fitting 30 of the end piece 10 will now be described in greater detail. Since the inlet fitting 30 and the outlet fitting 32 can be similarly configured, as in the preferred embodiment, only the inlet fitting 30 will be described herein. However, it is understood that the same description may be equally applicable to the outlet fitting 32. The inlet fitting 30 (preferably having a length from about 1.5 cm, about 2 cm, about 2.5 cm to about 3 cm, about 4 cm, about 5 cm) extends outwardly away from the end piece wall 12 and is cylindrically shaped (preferably having an inside diameter from about 0.3 cm, about 0.5 cm, about 0.6 cm to about 1 cm, about 1.2 cm, about 1.5 cm, and preferably having an outside diameter from about 0.5 cm, about 0.8 cm, about 1 cm to about 1.5 cm, about 1.8 cm, about 2 cm) at its proximal end 27 adjacent the end piece wall 12. A channel 60 runs the length of the inlet fitting 30. The channel 60 meets the cartridge housing 24 such that the inlet fitting 30 is in fluid communication with the interior space of the hollow cartridge housing 24 and thus the treatment material (not shown). The channel 60 has an opening 91 (preferably having a diameter from about 0.3 cm, about 0.5 cm, about 0.6 cm to about 1 cm, about 1.3 cm, about 1.5 cm) and an open portion (as used herein, the term "open portion" refers to the portion of a fitting which remains after a portion of it has been cut away and such portion would have, if not cut away, continued to form and define the fitting) 76 (preferably having a length from about 0.5 cm, about 0.8 cm, about 1 cm to about 2 cm, about 3 cm, about 4 cm, and preferably having a height from about 0.1 cm, about 0.3 cm, about 0.5 cm to about 1 cm, about 1.5 cm, about 2 cm, and preferably having a width from about 0.4 cm, about 0.7 cm, about 1 cm to about 1.5 cm, about 2.5 cm, about 3 cm) at the distal end 29 of the fitting 30. The open portion 76 is adjacent the protrusion 33, and permits water to easily flow from and to the opening 91. The channel 60 is exposed at the open portion 76. An o-ring 53 (preferably having an outside diameter from about 0.5 cm, about 0.8 cm, about 1 cm to about 2 cm, about 3 cm, about 4 cm) encircles the inlet fitting 30 and is placed adjacent the open portion 76, between the open portion 76 and the proximal end 27 of the inlet fitting 30. An actuation wall 62 (preferably having a length from about 0.4 cm, about 0.7 cm, about 1 cm to about 2 cm, about 2.5 cm, about 3 cm) extends away from the base 64 of the channel 60 of the inlet fitting 30 running along the direction of the longitudinal axis 14 of the inlet fitting 30. The actuation wall 62 has a flat portion 68 (preferably having a length from about 0.1 cm, about 0.4 cm, about 0.6 cm to about 1.5 cm, about 2 cm, about 3 cm, and preferably having a height from about 0.1 cm, about 0.2 cm, about 0.4 cm to about 1 cm, about 2 cm, about 3 cm, and preferably having a width from about 0.05 cm, about 0.1 cm, about 0.15 cm to about 0.3 cm, about 0.5 cm, about 1 cm) and an angled portion 70 (preferably having a length from about 0.1 cm, about 0.2 cm, about 0.4 cm to about 1 cm, about 2 cm, about 3 cm, and preferably having a height, at its highest point, from about 0.1 cm, about 0.2 cm, about 0.4 cm to about 1 cm, about 1.5 cm, about 2 cm, and preferably having a height, at its lowest point, from about 0 cm, about 0.1 cm, about 0.2 cm to about 0.5 cm, about 1 cm, about 1.5 cm, and preferably having a width from about 0.05 cm, about 0.08 cm, about 0.15 cm to about 0.25 cm, about 0.5 cm, about 1 cm) between the flat portion 68 and a leading portion 72 (preferably having a height from about 0 cm, about 0.1 cm, about 0.2 cm to about 0.5 cm, about 1 cm, about 1.5 cm, and preferably having a width from about 0.05 cm, about 0.1 cm, about 0.15 cm to about 0.5 cm, about 0.8 cm, about 1 cm) of the actuation wall 62.

The sum of the leading portion 72, the angled portion 70, and the flat portion 68 together, in this embodiment, form a cam surface 74 which engages a follower (e.g., 71), a described hereafter. The surface 74 may include more or less surfaces which physically touch a follower (e.g., 71) for the purpose of actuation. These surfaces may or may not be continuous. In the preferred embodiment, each of the three surfaces (leading portion 72, angled portion 70, and the flat portion 68) have different functions, as discussed more fully hereafter. However, a cam surface (e.g., 74), as defined by this invention, may optionally include a surface having multiple functions to actuate a valve (e.g. 42). For instance, the same surface may move a follower (e.g., 71), opening a valve (e.g., 42), and also hold the follower in place, so that the valve stays open. Also, it should be pointed out that the cam surface 74 of the actuation wall 62 may be angled and/or vectored in relation to the longitudinal axis 14 of the inlet fitting 30, the longitudinal axis 16 of the outlet fitting 32, the longitudinal axis 34 of the protrusion 33, the longitudinal axis 23 of the cartridge 20, and/or the line of insertion 18 of the cartridge 20, as discussed more fully hereafter. As shown in FIGS. 2-B and 3, the angled portion 70 of the cam surface 74 is illustrated with an essentially straight surface which is angled approximately 45 degrees relative to the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20. As is apparent from FIGS. 2-B and 3, angled portion 70 has a vector 13 which has a radial component which extends approximately 45 degrees from the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20. Since the vector 13 of the angled portion 70 has a radial component in relation to the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20, the angled portion 70 of the cam surface 74 is vectored. That is, the angled portion 70 radially faces away from the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20 approximately 45 degrees. Further, as shown in FIGS. 2-B and 3, the flat portion 68 of the cam surface 74 is illustrated with an essentially straight surface which is essentially not angled (that is, essentially parallel) relative to the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20. As is apparent from FIGS. 2-B and 3, flat portion 68 has a vector 15 having a radial component which extends approximately 90 degrees from the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20. Since the vector 15 of the flat portion 68 has a radial component in relation to one or more of the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20, the flat portion 68 of the cam surface 74 is vectored. That is, the flat portion 68 radially faces away from the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20 approximately 90 degrees. Further, since the vector 15 of the flat portion 68 is essentially radial only, the flat portion 68 is fully vectored.

The cam surface 74 of the actuation wall 62 contributes to the compactness and mechanical advantage of the invention, each of which is discussed more fully hereafter. The height of the actuation wall 62 is less than the inside diameter of the channel 60 of the inlet fitting 30 in order to provide a less obstructed channel 60 for the fluid to enter. The opening 91 permits a fluid to pass through the channel 60 of the inlet fitting 30 and enter the interior space of the cartridge housing 24. The channel 60 is aligned with the longitudinal axis 23 of the cartridge 20 so that the fluid entering the opening 91 of the inlet fitting 30 flows in a direction of the longitudinal axis 23 of the cartridge housing 24 through the channel 60.

For the purpose of further describing the preferred embodiment, but not for the purpose of limitation, and as shown in FIG. 2-C, the most distal portion of the protrusion end 41 to the most proximal portion of the inlet fitting 30 is preferably a distance (L9) from about 0.5 cm, about 0.7 cm, about 1 cm to about 1.5 cm, about 2 cm, about 2.5 cm, and the most distal portion of the protrusion end 41 to the most distal portion of the inlet fitting 30 is preferably a distance (L4 through L8) from about 1 cm, about 2 cm, about 2.5 cm to about 4 cm, about 4.5 cm, about 5 cm. The most distal portion of the protrusion end 41 to the most proximal portion of the open portion 76 is preferably a distance (L8) from about 0.5 cm, about 1 cm, about 1.5 cm to about 3 cm, about 4 cm, about 5 cm, and the most distal portion of the protrusion end 41 to the most distal portion of the open portion 76 is preferably a distance (L4 through L8) from about 1 cm, about 2 cm, about 2.5 cm to about 4 cm, about 4.5 cm, about 5 cm. The most distal portion of the protrusion end 41 to the most proximal portion of the actuation wall 62 is preferably a distance (L8) from about 0.5 cm, about 1 cm, about 1.5 cm to about 3 cm, about 4 cm, about 5 cm, and the most distal portion of the protrusion end 41 to the most distal portion of the actuating wall 62 is preferably a distance (L4 through L8) from about 1 cm, about 2 cm, about 2.5 cm to about 4 cm, about 4.5 cm, about 5 cm. The most distal portion of the protrusion end 41 to the most proximal portion of the flat portion 68 is preferably a distance (L7 through L8) from about 1 cm, about 1.5 cm, about 2 cm to about 3 cm, about 4 cm, about 5 cm, and the most distal portion of the protrusion end 41 to the most distal portion of the flat portion 68 is preferably a distance (L6 through L8) from about 1 cm, about 1.5 cm, about 2 cm to about 3 cm, about 4 cm, about 5 cm. The most distal portion of the protrusion end 41 to the most proximal portion of the angled portion 70 is preferably a distance (L6 through L8) from about 1 cm, about 1.5 cm, about 2 cm to about 3 cm, about 4 cm, about 5 cm, and the most distal portion of the protrusion end 41 to the most distal portion of the angled portion 70 is preferably a distance (L5 through L8) from about 1.5 cm, about 2 cm, about 2.5 cm to about 4 cm, about 4.5 cm, about 5 cm. The most distal portion of the protrusion end 41 to the leading portion 72 is preferably a distance (L5 through L8) from about 1.5 cm, about 2 cm, about 2.5 cm to about 4 cm, about 4.5 cm, about 5 cm.

While the length of the inlet fitting 30 preferably has a length from about 0.5 cm, about 0.8 cm, about 1 cm to about 4 cm, about 6 cm, about 7 cm, it may be at least about 0.5 cm and greater, without limitation, because it is application of this invention which dictates size, and such application may be residential or industrial. The same is true for any physical feature of this invention, including, but not limited to, the channel 60 of the inlet fitting 30, outlet fitting 32, protrusion 33, the opening 91, the open portion 76, the o-ring 53, the actuating wall 62, the cam surface 74, etc.

Figure 4:
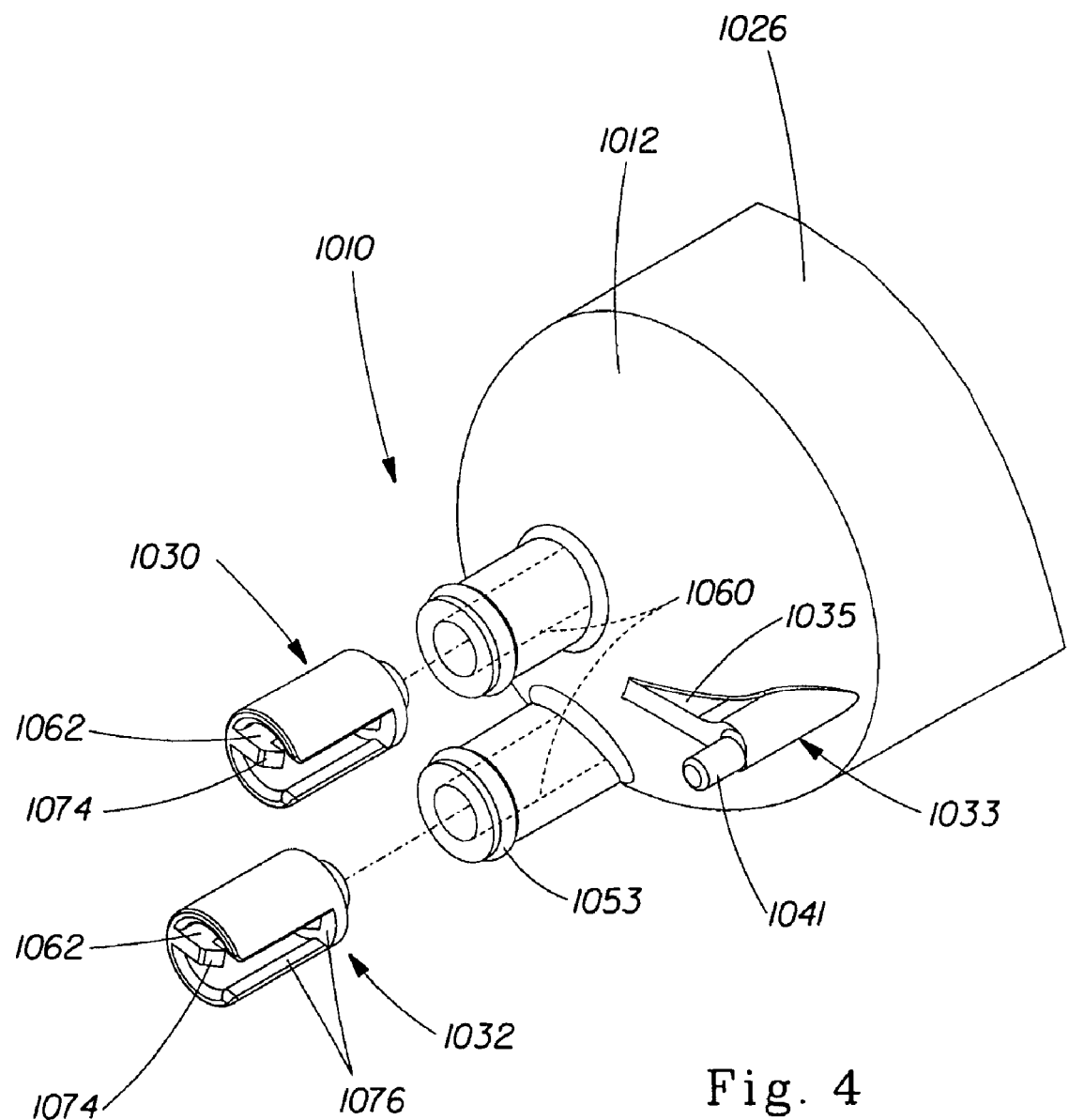
FIG. 4 is a perspective view of an alternative embodiment of the inlet and outlet fittings of the end piece of FIG. 3 showing attachable fittings having a cam surface.
Figure 5:
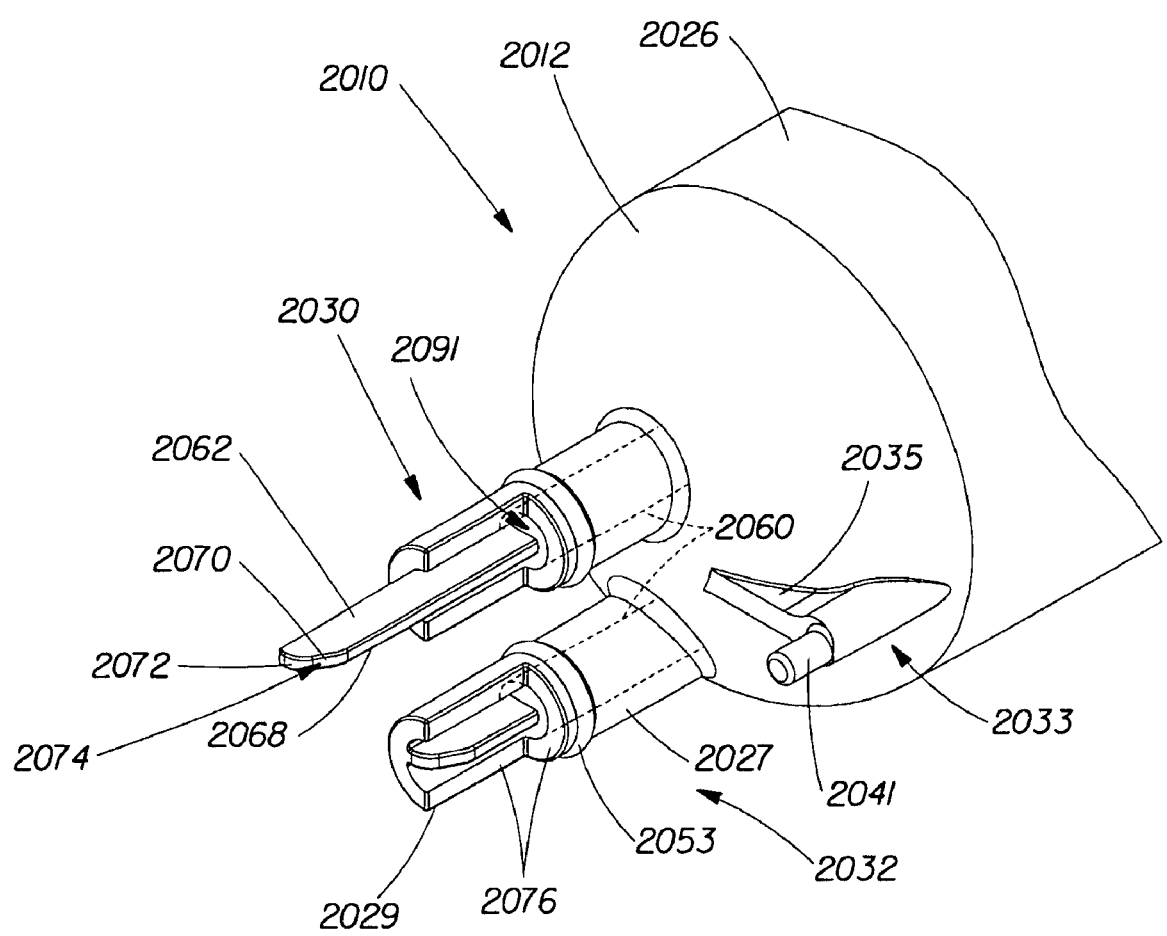
FIG. 5 is a perspective view of an alternative embodiment of the inlet fitting of the end piece of FIG. 3 showing an extended actuation wall having a cam surface.

Further regarding the inlet fitting 30, it should be understood that the inlet fitting 30 may be various lengths for purposes which include controlling the timing of valve (e.g., 42) actuation. Also, the inlet fitting 30 may be various diameters for reasons which include ensuring that the inlet fitting 30 is placed into the correct receiving port housing (e.g., 48 and 50). The inlet fitting 30 need not be circular as the inlet fitting 30 may be any number of various dimensions. Regarding the actuation wall 62 of the inlet fitting 30, the actuation wall 62 height may exceed the inside diameter of the channel 60 of the inlet fitting 30 or, as previously described, the height may be less than the inside diameter channel 60 of the fitting 30. Additionally, the actuation wall 62 may exceed the length of the channel 60 or may occupy only the distal end 29 of the inlet fitting 30. However, it should be understood that there should be enough actuation wall 62, and more particularly, cam surface 74, both in height, length, and width, to actuate a valve (e.g., 42). Additionally, regarding the open portion 76 in relation to the actuation wall 62, the open portion 76 may be more open than closed, or may be more closed than open (see also FIG. 4, page 15). However, it should be understood that enough of the actuation wall 62 should be exposed by the open portion 76 so that physical contact between the follower (e.g., 71) and the cam surface 74 of the actuation wall 62 can occur to facilitate actuation of the valve (e.g., 42). Alternatively, the actuation wall 62 may extend from the outside of the inlet fitting 30 instead of from the base 64 the channel 60 of the inlet fitting 30, eliminating a need for an open portion 76. Additionally, as shown in FIG. 5, the actuation wall 2062 may extend beyond the inlet fitting 2030. The cam surface 74 of the actuation wall 62 may be angled in relation to the longitudinal axis 14 of the inlet fitting 30, the longitudinal axis 16 of the outlet fitting 32, the longitudinal axis 34 of the protrusion 33, and/or the longitudinal axis 23 of the cartridge 20 (preferably having an angle from about 1 degree, about 10 degrees, about 15 degrees, to about 40 degrees, about 60 degrees, about 90 degrees). Also, the cam surface 74 of the actuation wall 62 may be vectored in relation to one or more of the longitudinal axis 14 of the inlet fitting 30, the longitudinal axis 16 of the outlet fitting 32, the longitudinal axis 34 of the protrusion 33, and/or the longitudinal axis 23 of the cartridge 20 (preferably vectored from about 1 degree, about 10 degrees about 15 degrees, to about 40 degrees, about 60 degrees, about 90 degrees) such that cam surface 74, or portion thereof, may be partially or fully vectored. In the preferred embodiment, width and length of the angled portion 70 of the actuation wall 62, between the leading portion 72 and the flat portion 68, may vary, as well as the degree which the angled portion 70 is angled and/or vectored from the longitudinal axis 14 of the inlet fitting 30, the longitudinal axis 16 of the outlet fitting 32, the longitudinal axis 34 of the protrusion 33, the longitudinal axis 23 of the cartridge 20, and/or the line of insertion 18, as long as the cam surface 74 of the actuation wall 62 adequately contacts a follower (e.g., 71) to facilitate actuation of a valve (e.g., 42) in an essentially orthogonal actuation motion 19 relative to the longitudinal axis 14 of the inlet fitting 30, the longitudinal axis 16 of the outlet fitting 32, the longitudinal axis 34 of the protrusion 33, the longitudinal axis 23 of the cartridge 20, and/or the line of insertion 18.

As mentioned earlier, the cam surface 74 of the actuation wall 62 contributes to the compactness of the head assembly 22. That is, the essentially orthogonal actuation motion 19 caused by the cam surface 74 of the actuation wall 62 allows for inlet and outlet passageway housings (e.g., 38 and 40) and inlet and outlet valves (e.g., 42 and 44) to be positioned essentially perpendicular to the line of insertion 18 of the cartridge 20. Such positioning allows for a head assembly (e.g., 22) to be shorter in length (the distance in-line with the line of insertion 18 of the cartridge 20) because a head assembly (e.g., 22) needs only to be a length sufficient to accommodate receiving port housings (e.g., outlet fitting and inlet fitting receiving port housings 48 and 50) which contain only a portion of a follower (e.g., 71). Receiving port housings (e.g., outlet fitting and inlet fitting receiving port housings 48 and 50) can be much shorter in length than a valve (e.g., inlet and outlet valves 42 and 44). Thus, the result of positioning of valves (e.g., 42 and 44), passageway housings (e.g., 38 and 40), and the port housings (e.g., 48 and 50) allows for a longer cartridge per fixed distance. Thus, when the compact orientation of a head assembly (e.g., 22) is discussed, it should be kept in mind that the cam surface 74 of the actuation wall 62 is responsible, in part, for allowing the particular orientation of a head assembly (e.g., 22).

Figure 9A:
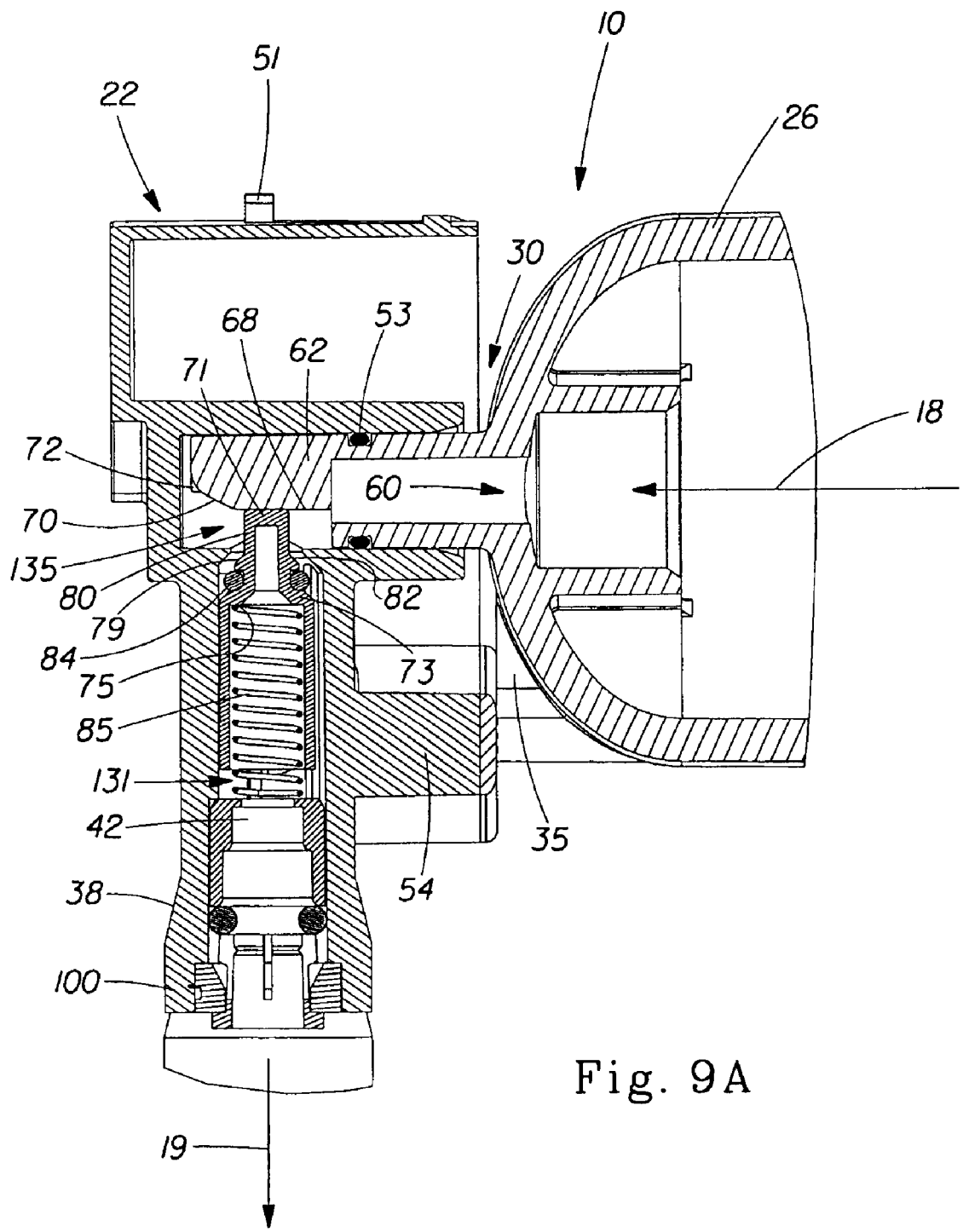
FIG. 9-A is a cross sectional top view of the head assembly and fully inserted end piece of the cartridge of FIG. 1 taken along line 9A/B-9A/B thereof, wherein the inlet valve is actuated and shown in the open position.
Figure 9B:
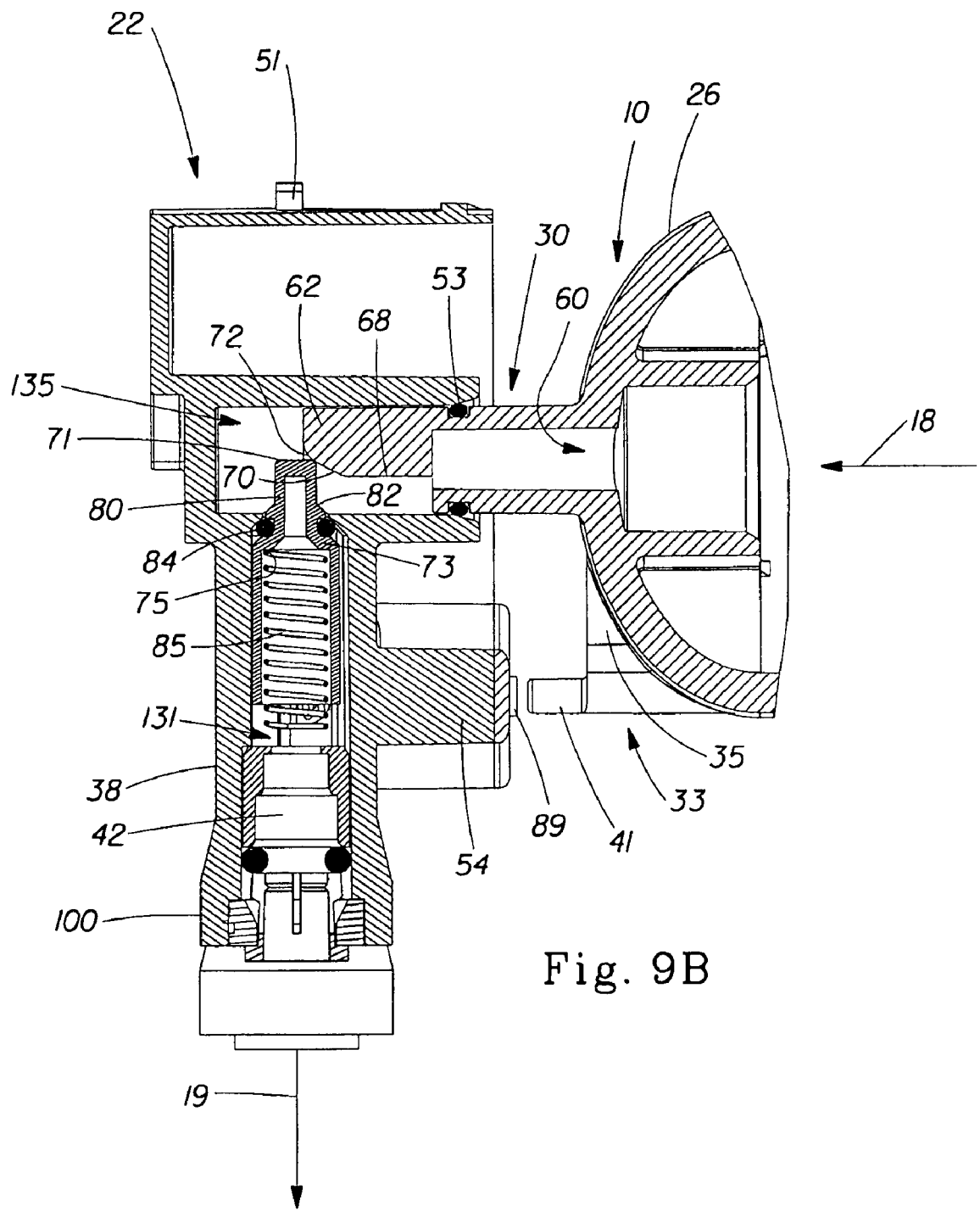

While the preferred embodiment discloses a cam surface (e.g., 74) on a wall (e.g., 62) that begins contact with a follower (e.g., 71) via a leading (e.g., portion 72) and maintains contact with a fully inserted end piece (e.g., 10) via a flat portion (e.g., 68) as shown in FIG. 9-A, it should be understood that an actuation wall (e.g., 62) need not include a flat portion (e.g., 68), and may maintain actuating contact with a follower (e.g., 71) via, for instance, an angled portion (e.g., 70).

Figure 6:
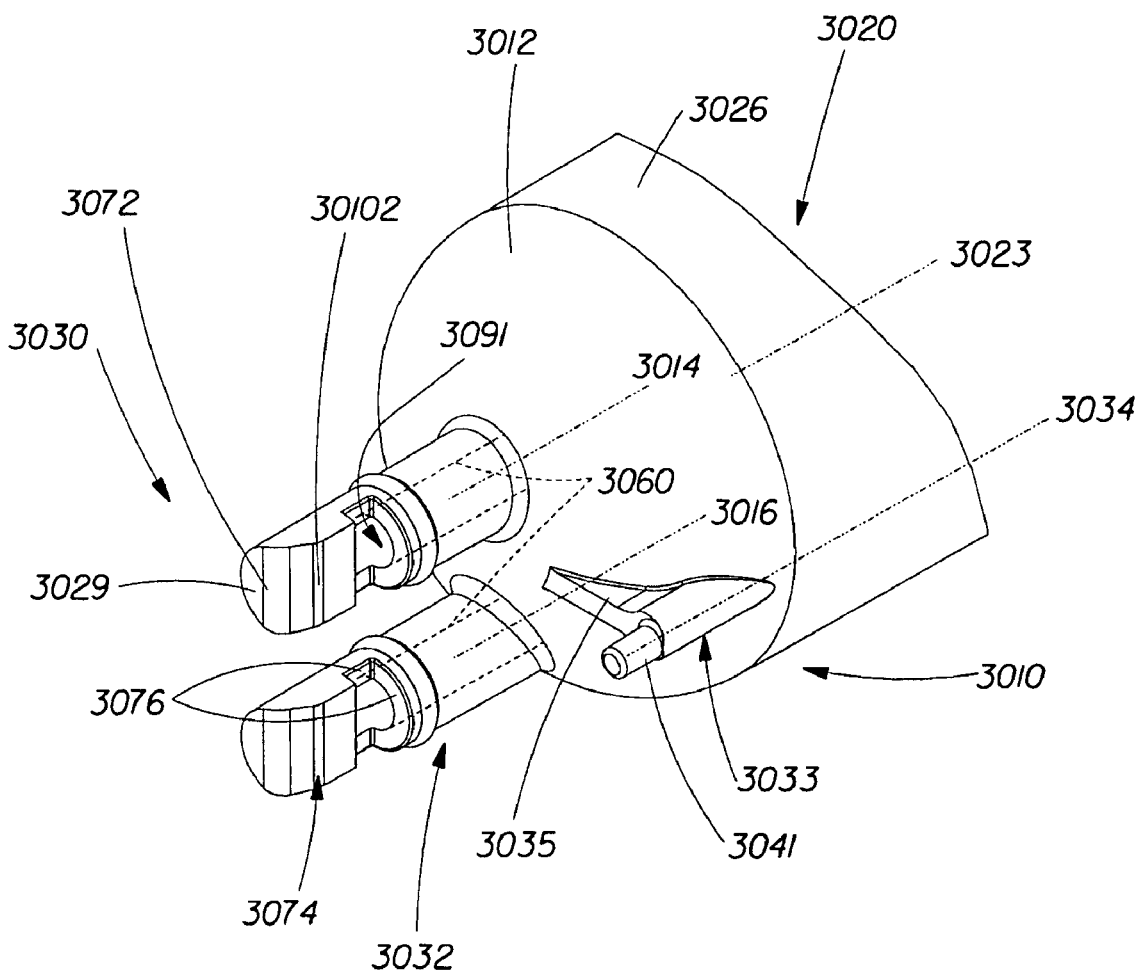
FIG. 6 is a perspective view of an alternative embodiment of the inlet and outlet fittings of the end piece of FIG. 3 showing the cam surface as a curved face.
Figure 7:
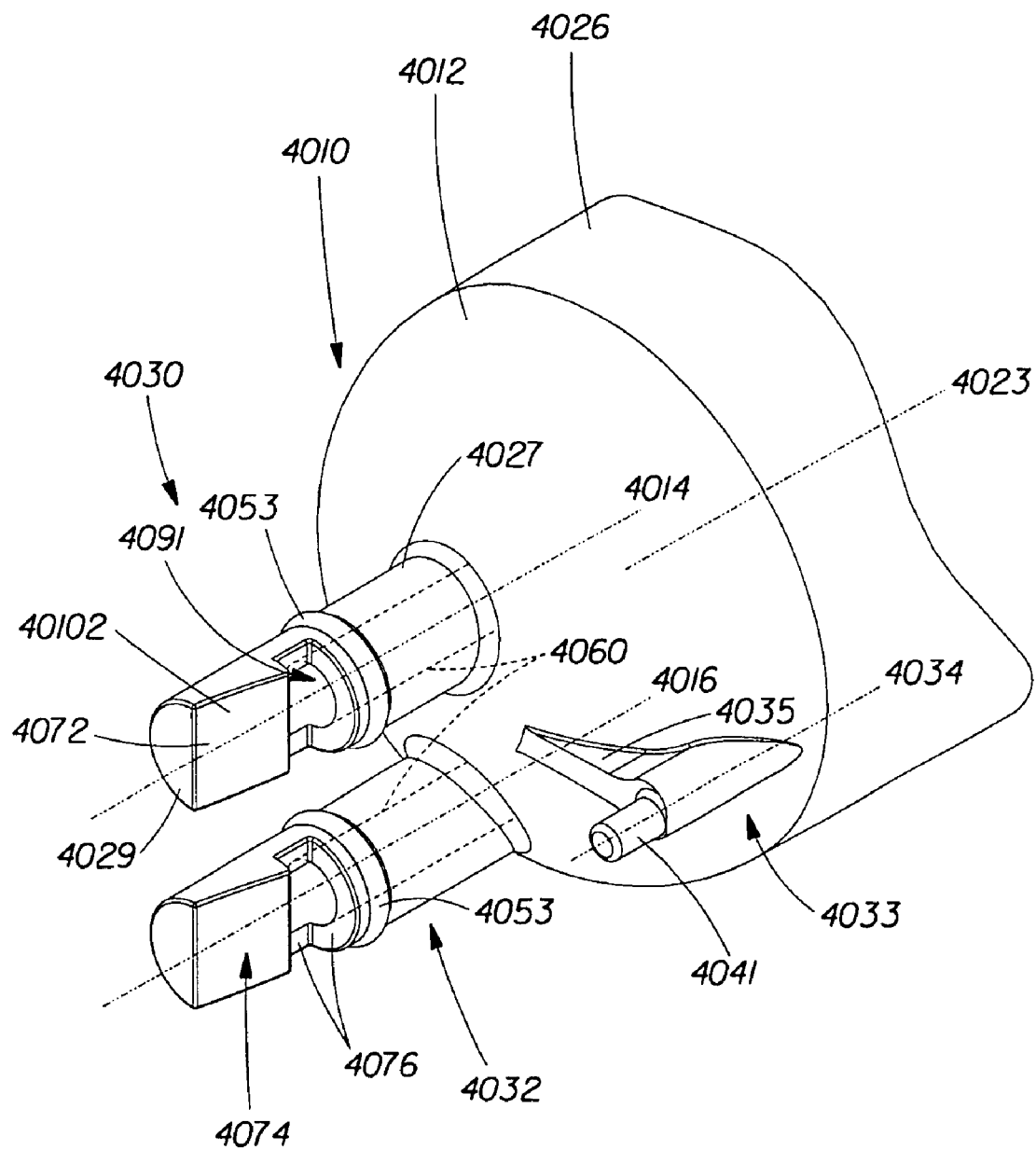
FIG. 7 is a perspective view of an alternative embodiment of the inlet and outlet fittings of the end piece of FIG. 3 showing the cam surface as a planar face.
Figure 8:
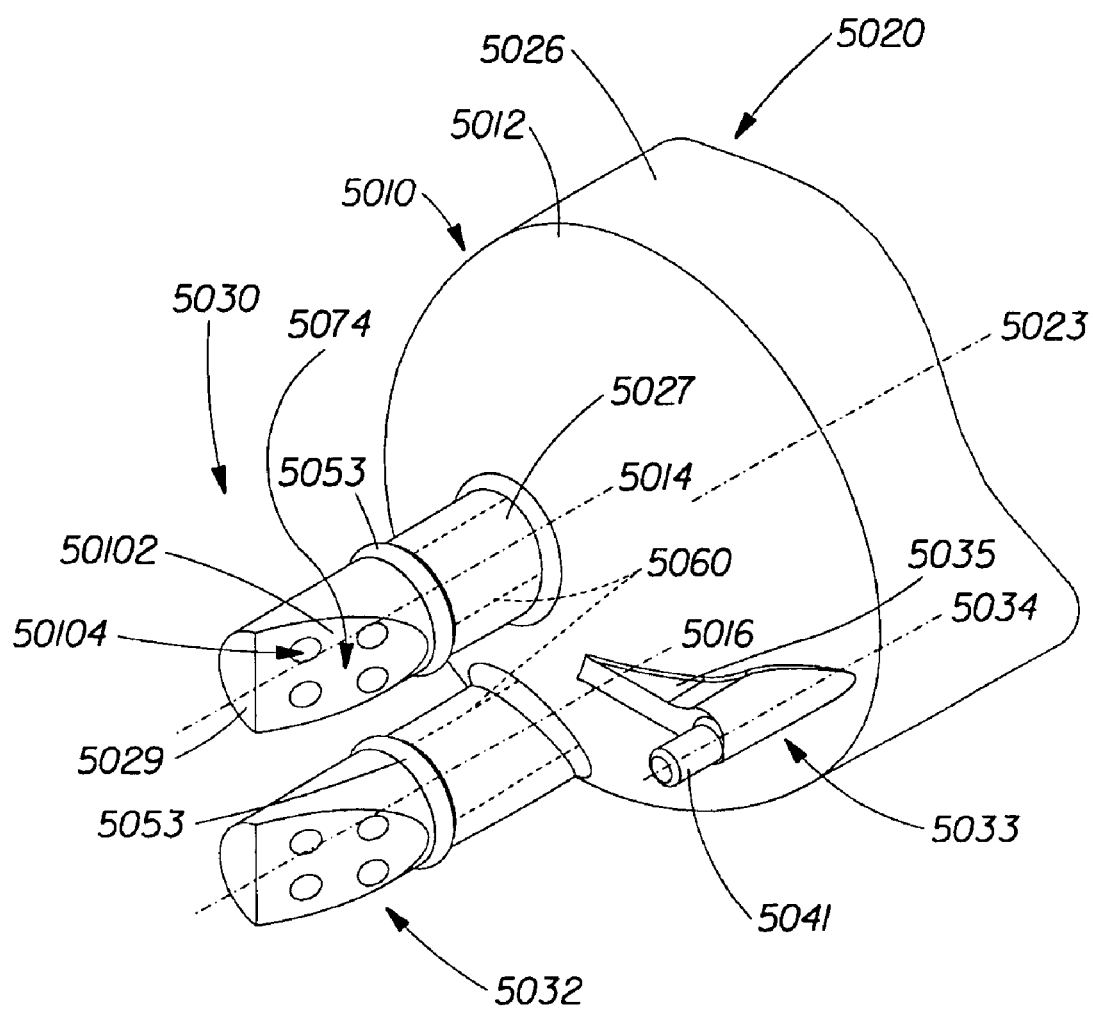
FIG. 8 is a perspective view of an alternative embodiment of the inlet fitting of the end piece of FIG. 3 showing openings on a planar face of a cam surface.

Alternatively, as shown in FIG. 6, in place of using an upstanding actuation wall (e.g., 62), the distal end 3029 of the inlet fitting 3030 may be angled and/or vectored (in relation to the longitudinal axis 3014 of the inlet fitting 3030, the longitudinal axis 3016 of the outlet fitting 3032, the longitudinal axis 3034 of the protrusion 3033, and the longitudinal axis 3023 of the cartridge 3020 (partially shown) from the leading portion 3072 toward the proximal end to a height and length appropriate for contacting a follower (e.g., 71) such that a face 30102 having a cam surface 3074 is formed (also illustrated in FIGS. 7 and 8). Like the actuation wall 62 described above, it is understood that the cam surface 3074 of the face 30102 may consist of surfaces that are at variable angles (even to the point of forming a curve or circle). In such an alternate embodiment, it is understood that the cam surface 3074 would include the sum of the portions of the face 30102 which contact a follower (e.g., 71) for the purpose of actuation. Also, in such an embodiment, the open portion 3076 may encompass a determined space between the distal end 3029 of the inlet fitting 3030 and the o-ring 3053 of the inlet fitting 3030. It is evident that the open portion 3076 may be various sizes, opening in any direction, as long as fluid communication is achieved between the channel 3060 and a port (e.g., 135).

As shown in FIG. 8, it is further anticipated that, in the event that the inlet fitting 5030 has a face (e.g., 50102) without an open portion (e.g., 76), there may be one or more openings 50104 through the face 50102 of the inlet fitting 5030. The openings 50104 would pass through the inlet fitting 5030 such that fluid communication with the channel 5060 of the inlet fitting 5030 would be achieved. Also, as shown in FIG. 4, it is anticipated that the fittings 1030 and 1032 which have a cam surface (e.g., 1074) may be separately attachable, in a retrofit manner, to a portion of the end piece 1010 not capable of actuating valves (e.g., 42 and 44) of a particular head assembly (e.g., 22). FIG. 4 also illustrates that when the cam surface 1074 is on a wall 1062, only a narrow open portion 1076 is required to allow for contact between a follower (e.g. 71) of valves (e.g., 42 and 44) and the cam surface 1074 of the fittings 1030 and 1032. Further, it is anticipated that an end piece (e.g., 10) may be made up of any combination or number of inlet or outlet fittings or protrusions (e.g., 30, 32, and 33) which may be extending in the same direction.

Figure 10:
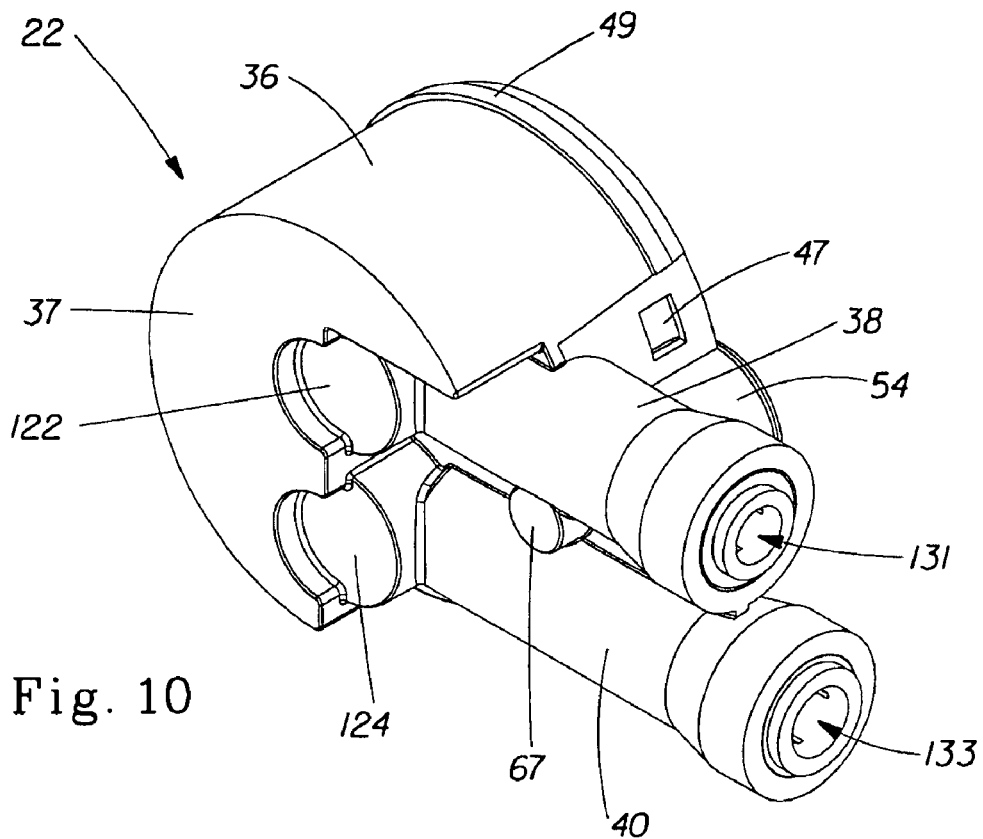
FIG. 10 is a perspective view of the head assembly of FIG. 1 showing the closed end.
Figure 19:
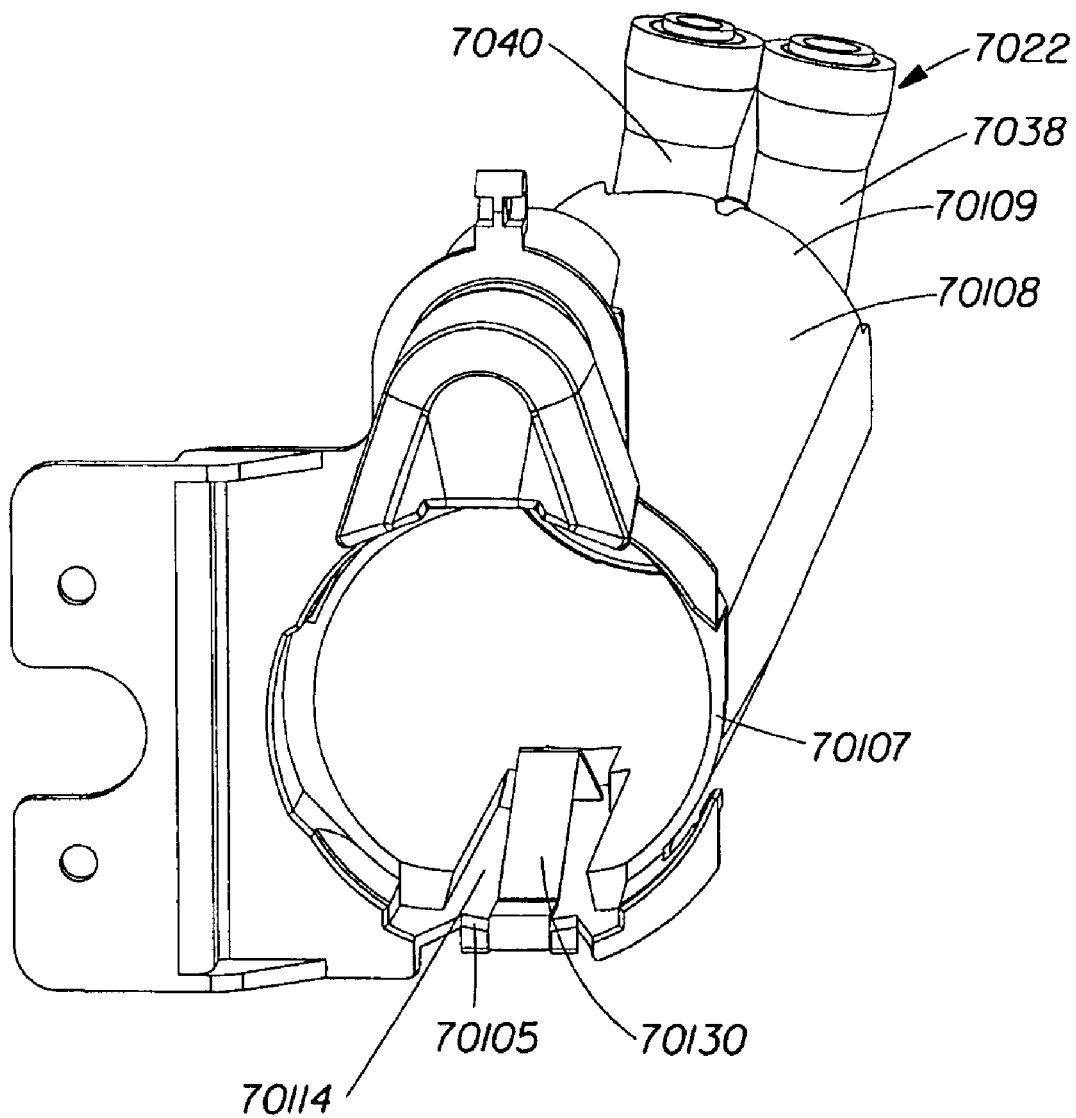
FIG. 19 is a perspective view of and alternate embodiment of the appliance casing of FIGS. 14-A and 14-B without the cartridge, wherein the appliance casing further includes a friction spring.

Referring to FIGS. 1 and 10, the head assembly 22, into which the end piece 10 of the cartridge 20 inserts, will now be generally described. The head assembly 22 includes a cylindrical head assembly housing 36 having a closed end 37 and an open end 39. Referring to FIG. 10, a cylindrical inlet passageway housing 38 and a cylindrical outlet passageway housing 40 join the outer surface of the head assembly housing 36 at the closed end 37, penetrating to the inner surface of the head assembly housing 36. Thus, the passageway housings 38 and 40 are partially inside and partially outside the head assembly housing 36. The passageway housings 38 and 40 form inlet and outlet passageways 131 and 133, respectively. While in the preferred embodiment the outlet passageway housing 40 extends from head assembly 22 a greater distance than the inlet passageway housing 38, it should be understood that the inlet passageway housing 38 may extend further than the outlet passageway housing 40, or the two may be the same length (as shown in FIG. 19). As shown in FIGS. 1 and 10, the head assembly 22 contains a cylindrical inlet fitting receiving port housing 48 (preferably having a length from about 1 cm, about 1.5 cm, about 2 cm, to about 4 cm, about 4.5 cm, about 5 cm, and preferably having an inner diameter from about 0.5 cm, about 0.7 cm, about 1 cm to about 2 cm, about 2.5 cm, about 3 cm, and preferably having an outer diameter from about 0.5 cm, about 0.7 cm, about 1 cm, to about 2.5 cm, about 3 cm, about 4 cm) and a cylindrical outlet fitting receiving port housing 50 (preferably having a length from about 1 cm, about 1.5 cm, about 2 cm to about 4 cm, about 4.5 cm, about 5 cm, and preferably having an inner diameter from about 0.5 cm, about 0.7 cm, about 1 cm to about 2 cm, about 2.5 cm, about 3 cm, and preferably having an outer diameter from about 0.5 cm, about 1 cm, about 1.5 cm to about 2.5 cm, about 3 cm, about 4 cm), each having an open end 118 and 120, respectively, and a closed end 122 and 124, respectively. The receiving port housings 48 and 50 form inlet and outlet receiving ports 135 and 137, respectively. Wholly within the head assembly housing 36, the inlet and outlet receiving port housings 48 and 50 and receiving ports 135 and 137 run along the longitudinal axis 45 of the cylindrical head assembly housing 36, meeting, but not penetrating the inner surface of the closed end 37 of the head assembly housing 36. Thus, the receiving port housings 48 and 50, and receiving ports 135 and 137 run perpendicular to the passageway housings 38 and 40, and passageways 131 and 133.

Figure 11:
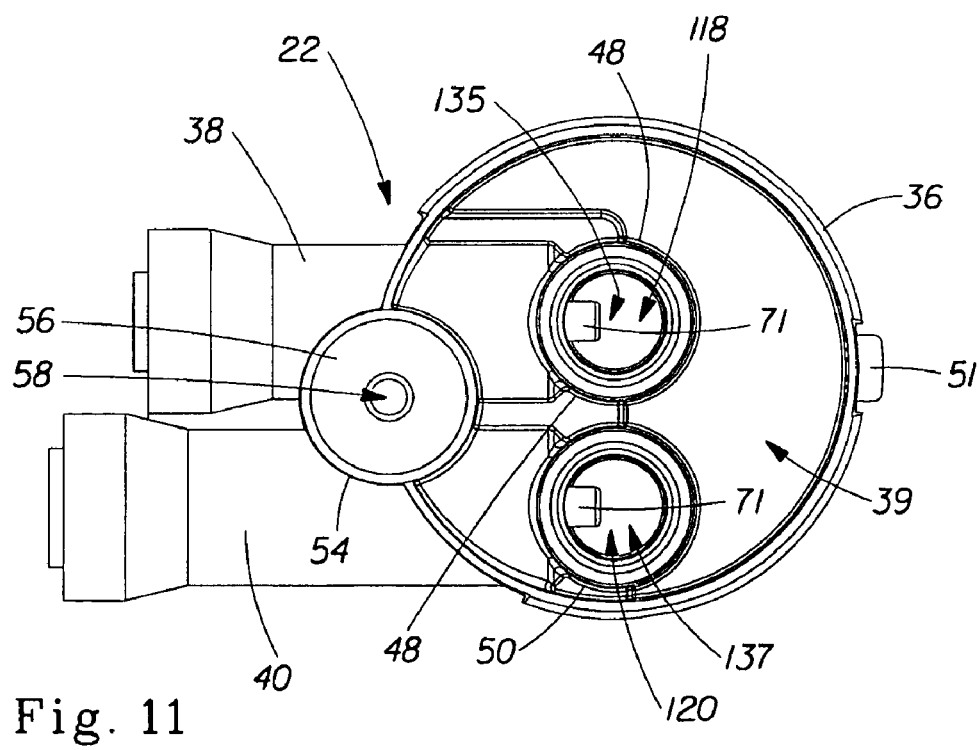
FIG. 11 is a front view of the head assembly of FIG. 1 showing the follower of the inlet and outlet valves in a closed position extending into the inlet and outlet receiving ports.

As shown in FIGS. 9-A and 9-B, the receiving port housing 48 and the passageway housing 38 meet, such that the inlet passageway 131 and the inlet receiving port 135 are in fluid communication via a receiving port/passageway opening 79. As shown in FIG. 10, the head assembly housing 36, between the passageway housings 38 and 40 and the open end 39, is slotted 47 through the outer and inner surfaces in two places to meet and surround appliance housing projections in a snap-fit manner (not shown). The outer surface of the head assembly housing 36 also has an encircling raised rim 49 adjacent the open end 39 for friction-fit attachment to an appliance. Further, as shown in FIG. 11, the outer surface of the housing 36 has a rectangular projection 51 opposite the passageway housings 38 and 40, between the closed and open ends 37 and 39 of the assembly housing 36, for attachment to an appliance. The portion of cylindrical assembly housing 36 defined by the space from the point of joining of the passageway housings 38 and 40 to the housing 36 and the point of joining of the receiving port housings 48 and 50 to the housing 36, to the closed end 37 may be cut away as shown in FIG. 10.

As shown in FIGS. 9-A and 9-B, the inlet passageway housing 38 has an inlet valve 42 slideably disposed therein. Also, the outlet passageway housing 40 has an outlet valve 44 slideably disposed therein (not shown). The valve 42 is biased to a closed position when an end piece 10 is not fully inserted into the head assembly 22. As shown in FIG. 1, the receiving port housings 48 and 50, and receiving ports 135 and 137 are sized and arranged to receive the cartridge inlet and outlet fittings 30 and 32, respectively, so that the fittings 30 and 32 can open the inlet and outlet valves 42 and 44, as discussed more fully hereafter. Because the receiving ports 135 and 137 are arranged approximately 90 degrees to their respective inlet and outlet passageways 131 and 133, insertion of the inlet and outlet fittings 30 and 32 into the receiving ports 135 and 137, respectively, actuates the inlet and outlet valves 42 and 44, respectively, in a direction approximately 90 degrees to the direction or line of insertion 18 of the fittings 30 and 32.

Regarding the orientation of the inlet and outlet valves 42 and 44 and as discussed earlier, the positioning of the inlet and outlet fittings 30 and 32 allows for the head assembly 22 to be compactly designed. That is relative to the line of insertion 18 of the cartridge 20, the length (distance in-line with the line of insertion 18 of the cartridge 20) of the head assembly 22 needs only to be adjusted for a portion of a follower (e.g., 71) of one valve (e.g., 42), not two valves, because one valve may be positioned directly above or below another, in a stacked orientation. In the preferred embodiment, relative to the line of cartridge 20 insertion 18, the inlet valve 42 housed within the inlet passageway housing 38 is directly above the outlet valve 44 housed within the outlet passageway housing 40. Thus, relative to the line of cartridge 20 insertion 18, the head assembly 22 can be shorter in length, allowing the cartridge 20 to be longer, further allowing more treatment material (not shown) to be in the cartridge 20, ultimately providing for better treatment of water.

Referring to FIGS. 9-A, 9-B, and 13, the inlet and outlet valves 42 and 44 will now be described in greater detail. Since the inlet valve 42 and the outlet valve 44 are similarly configured, only the inlet valve 42 will be described herein although it is understood that the same description may be equally applicable to the outlet valve 44. The inlet valve 42 includes an o-ring 84, a cylindrical poppet 80, a spring 85, a cylindrical tube stop 86, and a fitting 88. The fitting 88 includes a coupler 94, a stationary ring 92 and an o-ring 90. The o-ring 84 encircles a cylindrical follower 71 (preferably having a length from about 0.1 cm, about 0.2 cm, about 0.3 cm to about 1 cm, about 2 cm, about 3 cm, and preferably having a diameter from about 0.1 cm, about 0.2 cm, about 0.3 cm to about 1 cm, about 2 cm, about 3 cm) of the poppet 80 at a shoulder 82 of the poppet 80. When in a closed position, preferably from about 0.1 cm, about 0.2 cm, about 0.3 cm to about 1 cm, about 2 cm, about 3 cm of the follower 71 of the poppet 80 is biased into the inlet receiving port 135 through the port/passageway opening 79 by a first end 75 of the spring 85 which is in contact with a second end 73 of the poppet 80 (such that the most distal portion of the follower 71 is preferably from about 0.1 cm, about 0.2 cm, about 0.3 cm, to about 1 cm, about 2 cm, about 3 cm from the most proximal portion of the inlet receiving port housing 48), leaving the o-ring 84 to be biased against the inlet passageway housing 38 by the shoulder 82 of the poppet 80 as the port/passageway opening 79 is of a diameter to allow the passage of the follower 71 of the poppet 80, but not of a diameter to allow the passage of the o-ring 84. The follower 71 may occupy the inlet receiving port 135 to varying degrees, as long as the follower 71 is able to be actuated by the cam surface 74 of the actuation wall 62 of the inlet fitting 30, discussed more fully below.

A second end 77 of the spring 85 is in contact with a first end 81 of the tube stop 86. A second end 83 of the tube stop 86 is in contact with the o-ring 90 of the fitting 88. The o-ring 90 is in contact with a first end 96 of the coupler 94 and the coupler 94 is in contact with the stationary ring 92. The stationary ring 92 is fixed to the inside of an appliance connecting end 100 of the inlet passageway housing 38 and neither the first end 96 of the coupler 94 can fit through the stationary ring 92, nor can a second end 98 of the coupler 94. However, a body 95 of the coupler 94 can slide between the first and second ends 96 and 98 when encircled by the stationary ring 92. Thus, the stationary ring 92 securely and operably contains the other parts of the inlet valve 42 in the inlet passageway housing 38. More specifically, the spring 85 biases both the follower 71 into the inlet receiving port 135 and biases the first end 96 of the coupler 94 against the stationary ring 92. Because the spring 85 acts to bias both the first end 96 of the coupler 94 and the follower 71 of the poppet 80, when either the second end 98 of the coupler 94 or the follower 71 of the poppet 80 is forced toward the other, the bias increases.

As previously mentioned, the inlet receiving port housing 48 and inlet receiving port 135 are sized to receive the inlet fitting 30 when the end piece 10 is inserted into the head assembly 22. As shown in FIG. 9-B, the inlet valve 42 remains in a closed position, such that the follower 71 of the poppet 80 is biased into the inlet passageway 131 by the first end 75 of the spring 85 which is in contact with the second end 73 of poppet 80 such that the follower 71 of the poppet 80 is biased through the port/passageway opening 79 to the inlet receiving port 135, leaving the o-ring 84 to be biased against the inlet passageway housing 38. When in the closed position, the poppet shoulder 82 and o-ring 84 blocks the port/passageway opening 79 so that the inlet receiving port 135 and the inlet passageway 131 are not in fluid communication with each other. In other words, when the appliance does not have the end piece 10 inserted, the inlet valve 42 is in a closed position such that fluid cannot circulate from the inlet passageway 131 to the inlet receiving port 135 through the port/passageway opening 79.

As shown in FIG. 9-A, when the end piece 10 is fully inserted into the head assembly 22, the inlet fitting 30 is directed into the inlet receiving port housing 48 such that the leading portion 72 of the actuation wall 62 first touches the follower 71 of the poppet 80, then, as cartridge 20 insertion continues, the angled portion 70 of the actuation wall 62 forces the follower 71 toward the appliance connecting end 100 of the inlet passageway housing 38 such that the poppet 80 moves perpendicular to the line of insertion 18 of the end piece 10. The cartridge 20 continues to be inserted such that the follower 71 moves along angled portion 70 to the flat portion 68 of the actuation wall 62 of the inlet fitting 30. Forcing the follower 71 of the poppet 80 toward the appliance connecting end 100 of the inlet passageway housing 38 relieves the bias upon the o-ring 84 such that the port/passageway opening 79 is opened. It is apparent that the leading portion 72, the angled portion 70, and the flat portion 68 each have different functions. That is, the leading portion 72 is the first surface to physically contact the follower 71, beginning the process of actuation of the valve 42, the angled portion 70 is responsible for moving the follower 71, forcing the valve 42 to an open position, and the flat portion is responsible for holding the follower 71 so that the valve 42 remains in an open position. As mentioned earlier, it is within the scope of this invention that a cam surface (e.g., 74) may comprise only a single surface that first contacts, moves, and holds open a follower (e.g., 71). When in the open position, the port/passageway opening 79 is open such that fluid communication between the inlet receiving port 135 and the inlet passageway 131 is allowed. In other words, when the appliance does have the end piece 10 fully inserted, the inlet valve 42 is in an open position such that fluid is free to circulate from the inlet passageway 131 to the inlet receiving port 135.

As mentioned earlier, the cam surface 74 of the actuation wall 62 contributes to the mechanical advantage of this invention. As mentioned, the spring 85 exerts a force to bias follower 71 into the receiving port 135 at a vector perpendicular to the line of cartridge 20 insertion 18. In order to overcome the force of the spring 85 with an object having an opposite vector, it would take slightly greater force than the force exerted by the spring 85. Thus, in order to move the follower 71 (so that the valve 42 is in an open position) with an object having an opposite vector to the spring 85, such would require a force slightly greater than that which is exerted by the spring 85. However, it is possible, according to this Invention, to overcome the force exerted by the spring 85 with less force than that exerted by the spring 85 by applying a force which has a perpendicular vector to that of the spring 85. Thus, because the cam surface 74 enables one to actuate the valve 42 by inserting the cartridge 20 at a vector perpendicular to the vector of the spring 85, a mechanical advantage is gained.

Though the inlet and outlet fittings 30 and 32 are similarly configured in the preferred embodiment, it is understood that the outlet fitting 32 need not have a cam surface (e.g., 74). Likewise, though the inlet and outlet valves 42 and 44 are similarly configured in the preferred embodiment, the outlet valve 44 need not be actuated via a fitting (e.g., 30) having a cam surface (e.g., 74). Thus, it is anticipated that the outlet valve 44 may be, for example, actuated by pressure from fluid emitted from an outlet fitting (e.g., 32) which does not have a cam surface (e.g., 74). Additionally, the end piece 10 may include one or more inlet fittings (e.g., 30) in combination with or without one or more outlet fittings (e.g., 32) or protrusions (e.g., 33).

Optionally, as shown in FIG. 1, a cylindrical bypass passageway housing 54 may join the outer surface of the head assembly housing 36 of the head assembly 22, running along the longitudinal axis 45 of the housing 36, penetrating to the inner surface of the housing 36. The bypass passageway housing 54 forms a bypass passageway 139. Thus, the bypass passageway housing 54 and passageway 139 is partially inside and partially outside the head assembly housing 36. Further, the bypass passageway housing 54 and passageway 139 are positioned to perpendicularly meet the inlet and outlet passageway housings 38 and 40, and passageways 131 and 133, cylindrically tapering between the passageway housings 38 and 40.

Figure 12A:
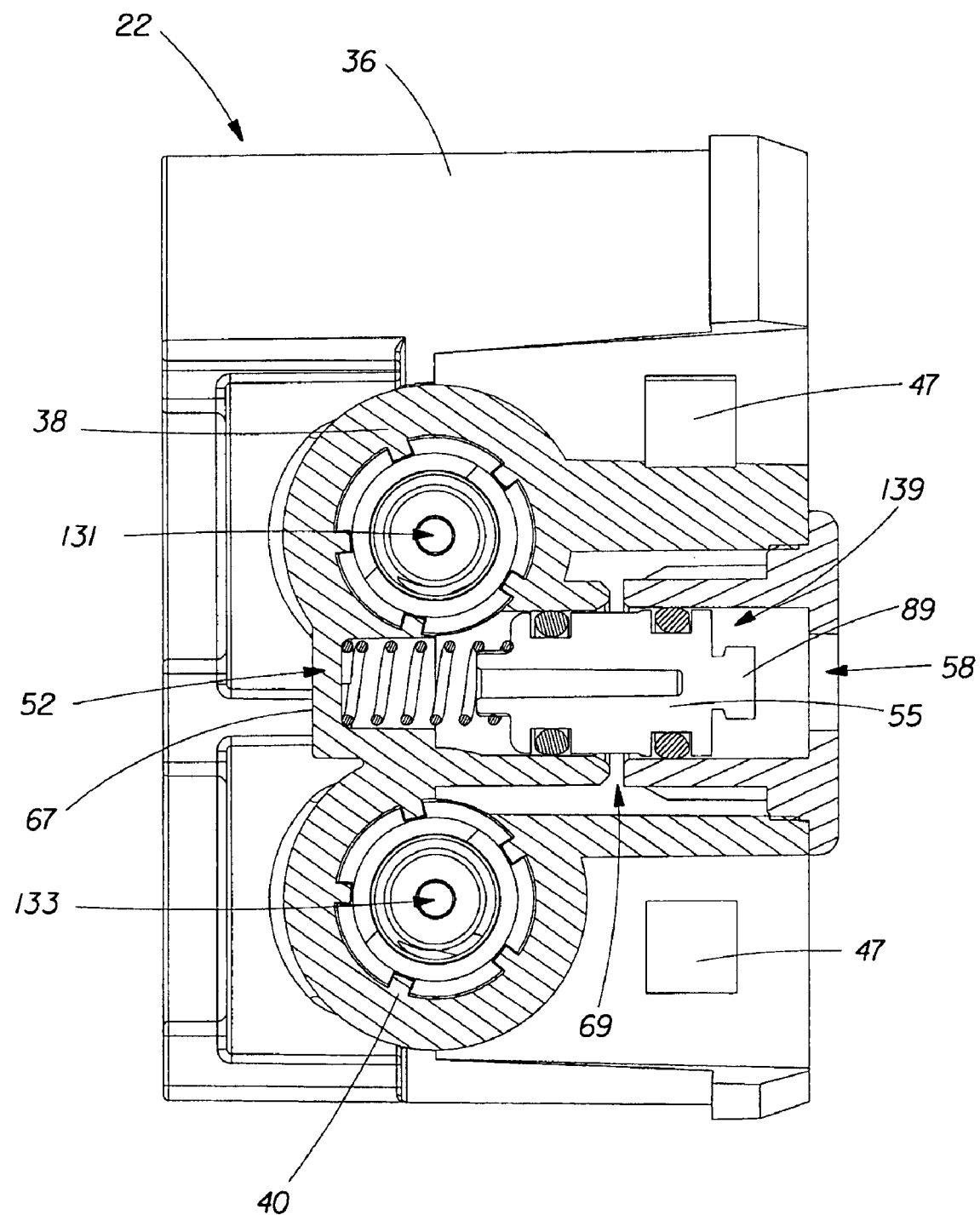
FIG. 12-A is a cross sectional view of the bypass valve of the head assembly of FIG. 1 taken along line 12A/B-12A/B thereof, wherein the bypass valve is shown in the closed position.
Figure 12B:
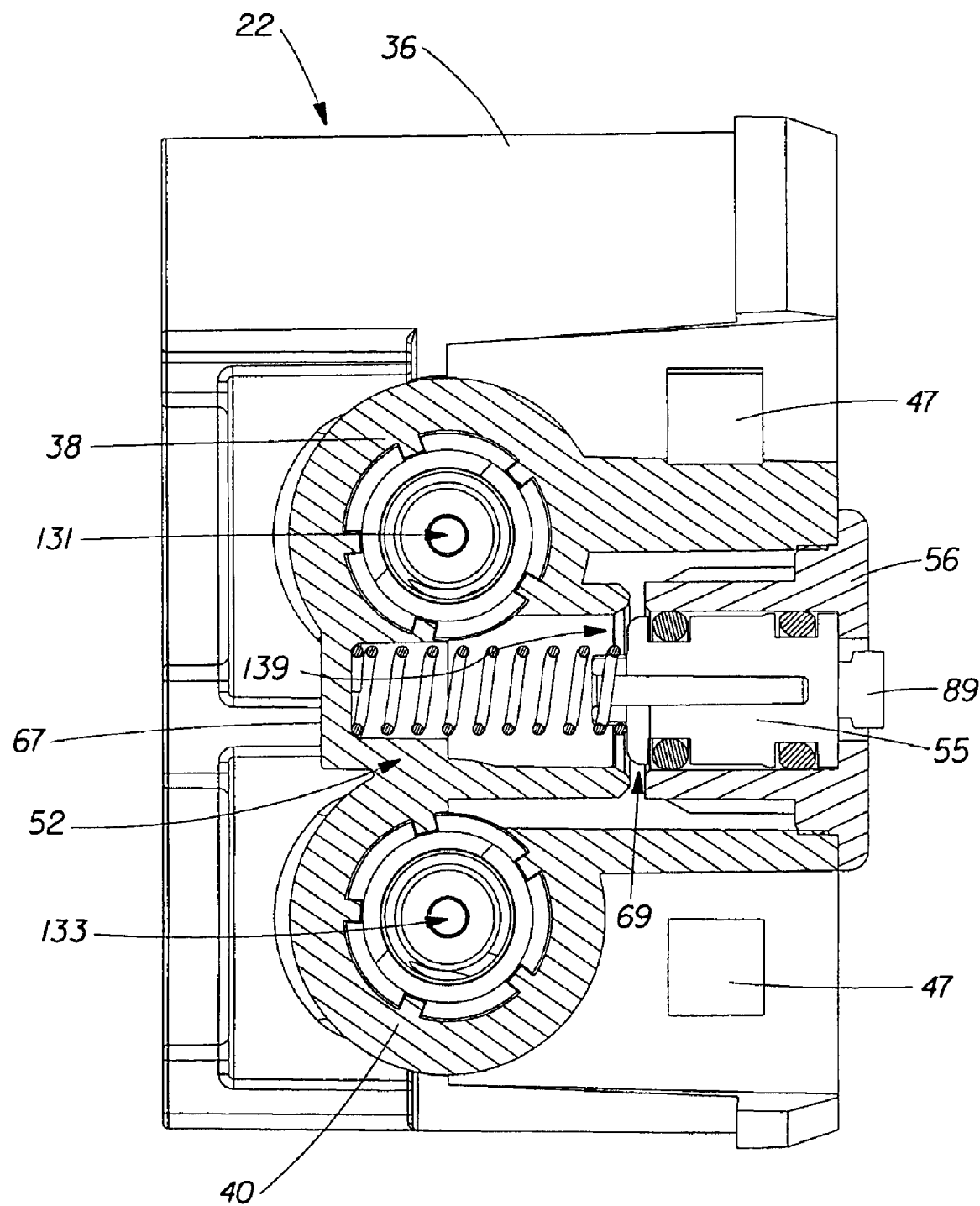
Figure 13:
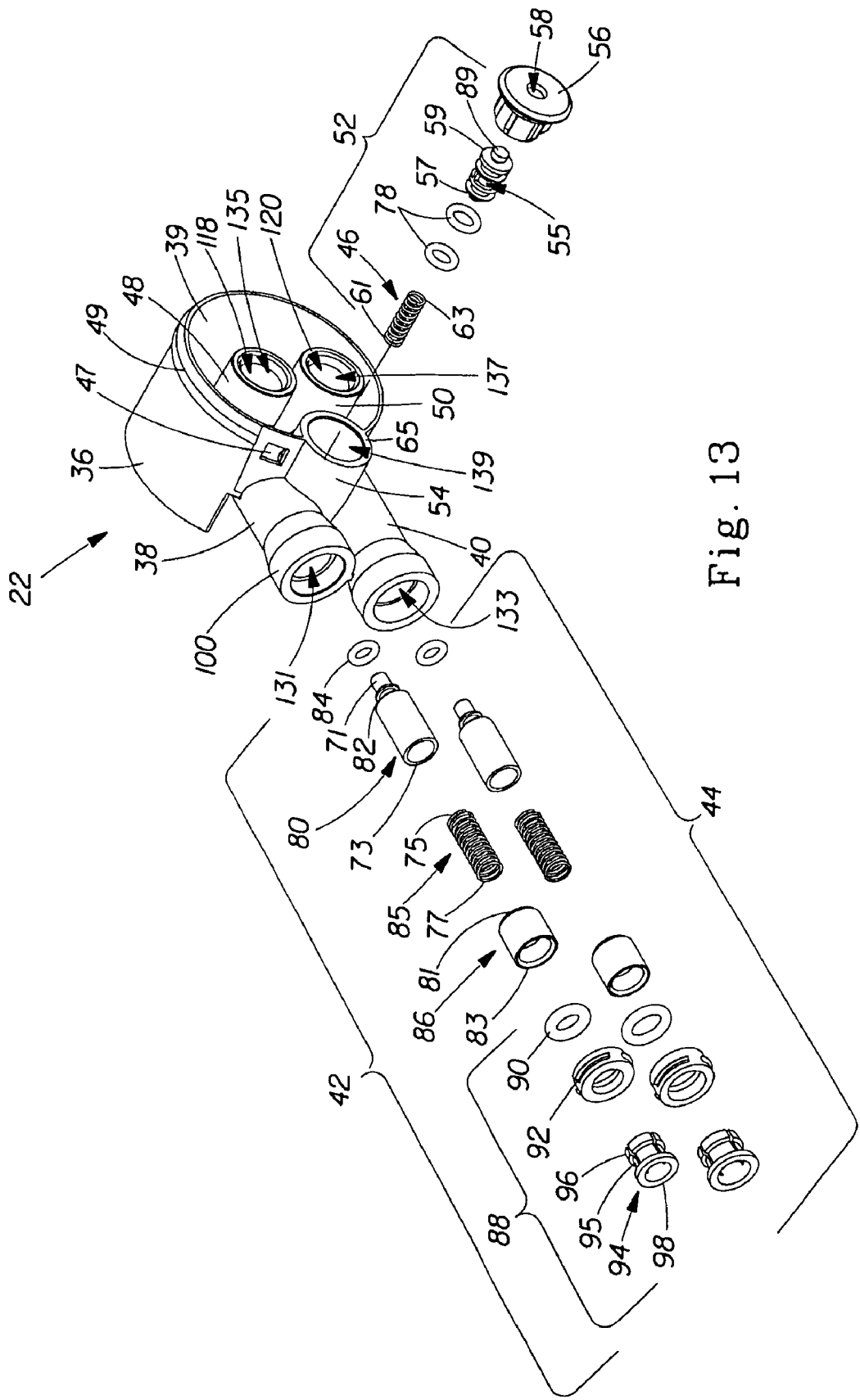
FIG. 13 is an exploded perspective view of the head assembly FIG. 1.

As shown in FIGS. 12 A and B, the bypass passageway 139 and the inlet and outlet passageways 131 and 133 are in fluid communication via a bypass channel 69. Thus, the bypass channel 69 places the bypass passageway 139 in fluid communication with both the inlet and outlet passageways 131 and 133, as well as placing the inlet passageway 131 and the outlet passageway 133 in untreated fluid communication with each other, which will be discussed more fully hereafter. Further regarding the positioning of the bypass passageway housing 54 and passageway 139, the bypass passageway housing 54 and passageway 139 are parallel to the receiving port housings 48 and 50, and receiving ports 135 and 137. However, the bypass passageway 139 and the receiving ports 135 and 137 do not meet. Further, the positioning of the bypass passageway housing 54 and passageway 139 is such that the passageway housing 54 and passageway 139 slightly extends beyond the open end 39 of the housing 36 of the head assembly 22 and are between the slots 47, as shown in FIGS. 12 A and B. A bypass valve 52 can be slideably provided within bypass passageway housing 54. As shown in FIG. 13, a retainer 56 retains the bypass valve 52 within the bypass passageway housing 54. A spring 46 biases the bypass valve 52 to an open position (FIG. 12-B) when the end piece 10 is not mated with the head assembly 22. An opening 58 within the retainer 56 is sized to receive the protrusion end 41 in order to close the bypass valve 52 when the end piece 10 is mated with the head assembly 22, as discussed more fully hereafter. Thus, the bypass passageway 139, the inlet receiving port 135, and the outlet receiving port 137 are aligned parallel to each other and are also aligned with the direction in which the end piece 10 is inserted into the head assembly 22.

Regarding the orientation of the bypass valve 52 and as discussed earlier, the positioning of the bypass valve 52 (being between the inlet and outlet fittings 30 and 32, and the most distal portion of the protrusion 33 being proximal to the most distal portion of the fittings 30 and 32) allows for the head assembly 22 to be compactly designed. That is, relative to the line of insertion 18 of the cartridge 20, the height (vertical distance perpendicular to the line of insertion 18) of the head assembly 22 needs only to be adjusted for two valves, not three valves. That is, when a bypass valve (e.g., 52) is used, as in the preferred embodiment, the placement of the bypass valve 52 adjacent to and between the inlet and outlet valves 42 and 44 contributes to compactness. That is, relative to the line of insertion 18 of the cartridge 20, the height of the head assembly 22 needs only to accommodate the inlet valve 42 housed within the inlet passageway housing 38 and the outlet valve 44 housed within the outlet passageway housing 40, in a stacked orientation. Thus, relative to the line of cartridge 20 insertion 18, the head assembly 22 can be adjusted to the height of two valves instead of three, allowing the head assembly 22 to be more compact, because the inlet and outlet fittings 30 and 32 and the protrusion 33 are so sized and arranged.

Referring to FIG. 13, the bypass valve 52 will now be described in greater detail. The bypass valve 52 includes the spring 46, two o-rings 78, a bypass shuttle 55, and the retainer 56. Each o-ring 78 encircles a first end 57 and a second end 59 of the bypass shuttle 55. The second end 59 of the shuttle 55 is biased against the retainer 56 by a second end 63 of the spring 46 which is in contact with the first end 57 of the shuttle 55 such that a shuttle nipple 89 occupies the retainer opening 58. A first end 61 of the spring 46 is in contact with the cylindrically tapered second end 67 (illustrated in FIG. 10) of the bypass passageway housing 54 which is positioned between the inlet and outlet passageway housings 38 and 40, as shown in FIG. 10. The retainer 56 fits sealingly into the first end 65 of the bypass passageway housing 54 such that the bypass shuttle 55 and the spring 46 are operably contained within the bypass passageway housing 54.

As previously mentioned, the retainer opening 58 is sized to receive the protrusion end 41 when the end piece 10 is inserted into the head assembly 22. As shown in FIG. 12-B, the bypass valve 52 remains in an open position when the end piece 10 is not inserted, such that the shuttle nipple 89 occupies the retainer opening 58. When in the open position, the bypass shuttle 55 does not block the bypass channel 69 so that the inlet and outlet passageways 131 and 133 are in untreated fluid communication with each other. In other words, when the appliance does not have the end piece 10 inserted, the shuttle 55 is in an open position such that untreated fluid will circulate from the inlet passageway 131 through the bypass channel 69 to the outlet passageway 133. When the end piece 10 is fully inserted, the protrusion 33 of the end piece 10 is directed into the retainer opening 58 such that the protrusion end 41 meets the shuttle nipple 89, pushing the nipple 89, and thus the shuttle 55, toward the second end 67 of the bypass passageway 139 to a closed position, as shown in FIG. 12-A. When in the closed position, the bypass shuttle 55 blocks the bypass channel 69 so that the inlet and outlet passageways 131 and 133 are in treated fluid communication with each other through the cartridge 20. In other words, when the appliance does have the end piece 10 fully inserted, the shuttle 55 is in a closed position such that fluid is forced to circulate from the inlet passageway 131 through the cartridge 20, then to the outlet passageway 133.

The actuation of the inlet, outlet, and bypass valves 42, 44, and 52 of the preferred embodiment, as a system, will now be summarily described. Prior to insertion of the end piece 10 into the head assembly 22, fluid coming from the appliance will meet the inlet valve 42 in a closed position, blocking the port/passageway opening 79 so that the inlet passageway 131 and the inlet receiving port 135 are not in fluid communication with each other. Thus, fluid cannot circulate from the inlet passageway 131 to the inlet receiving port 135 through the port/passageway opening 79. However, prior to end piece 10 insertion, the bypass valve 52 is in an open position such that untreated fluid will circulate from the inlet passageway 131 through the bypass channel 69 to the outlet passageway 133 and back through the appliance.

Once the cartridge 20 has been fully inserted into the appliance casing 108, and more specifically, the end piece 10 is fully inserted into the head assembly 22, fluid coming from the appliance will meet the inlet valve 42 in an open position in that the port/passageway opening 79 is open, allowing for fluid communication between the inlet receiving port 135 and the inlet passageway 131. Thus, fluid is free to circulate from the inlet passageway 131 to the inlet receiving port 135. Also, the cartridge protrusion end 41 meets the shuttle nipple 89, pushing the nipple 89, and thus the shuttle 55 toward the second end 67 of the bypass passageway housing 54 to a closed position. Thus, the only pathway for the fluid to circulate is from the inlet passageway 131 to the inlet receiving port 135 through the inlet fitting 30 into the cartridge 20. The now treated fluid will then pass through the outlet fitting 32 to the outlet receiving port 137 into the outlet passageway 133 and finally back through the appliance.

In the preferred embodiment, actuation of the inlet, outlet, and bypass valves 42, 44, and 52 are actuated essentially simultaneously by insertion of the end piece 10. It should be understood that it is anticipated that the present invention may be modified to allow for any combination of actuation of the valves 42, 44, and 52.

Figure 14A:
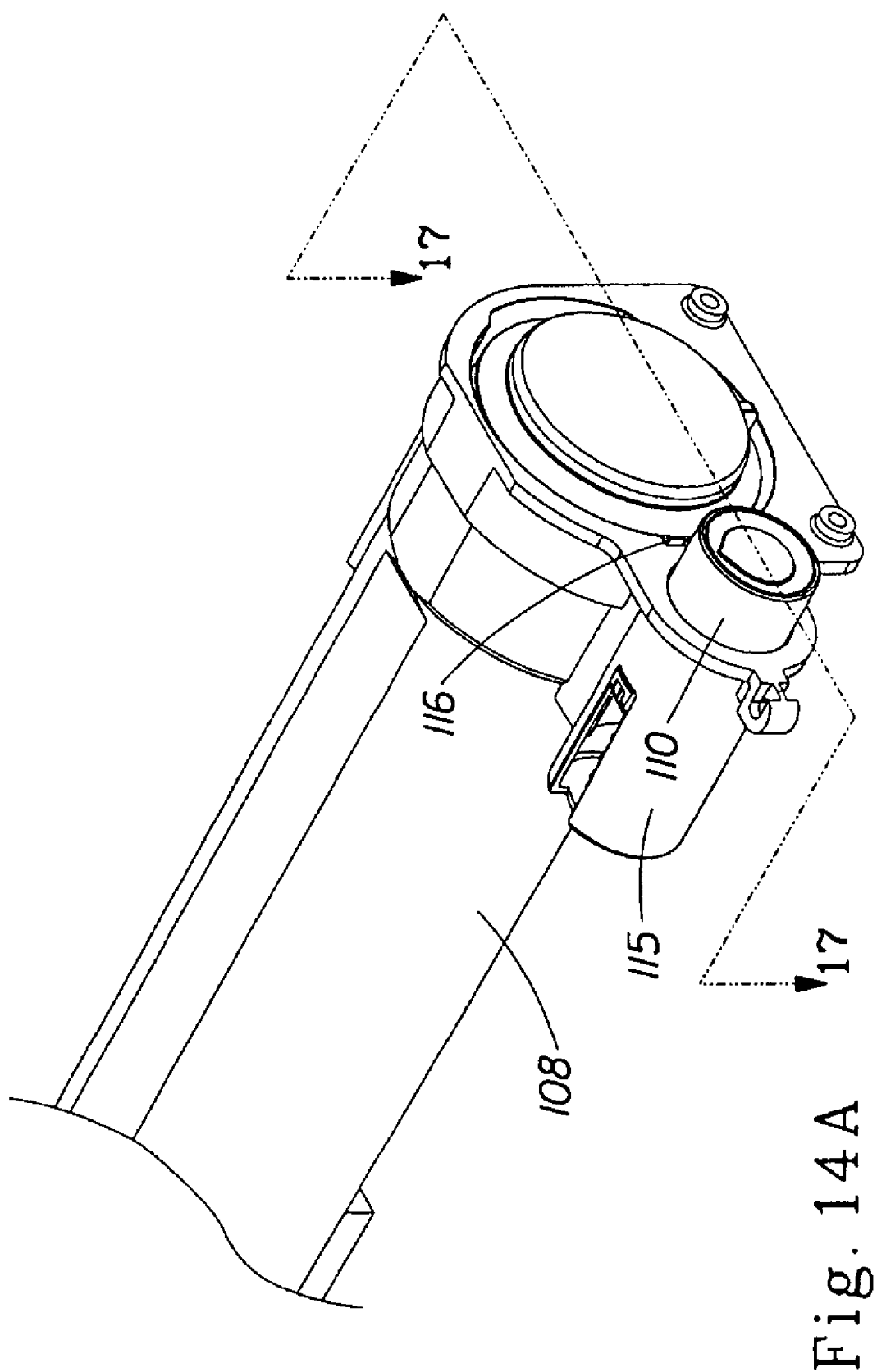
FIG. 14-A is a perspective view of the cartridge of FIG. 1. fully inserted and latched in an appliance casing.
Figure 14B:
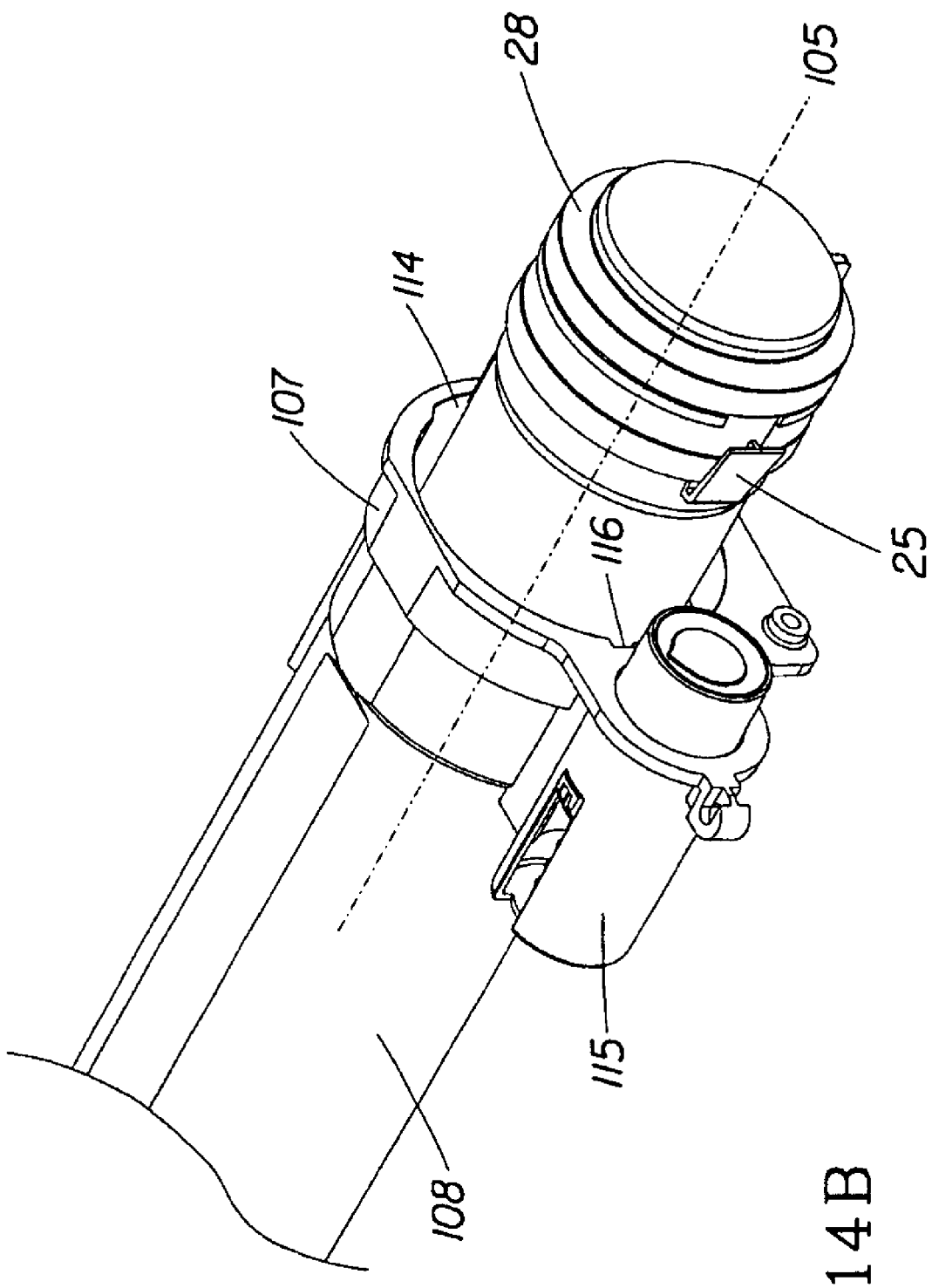
Figure 17:
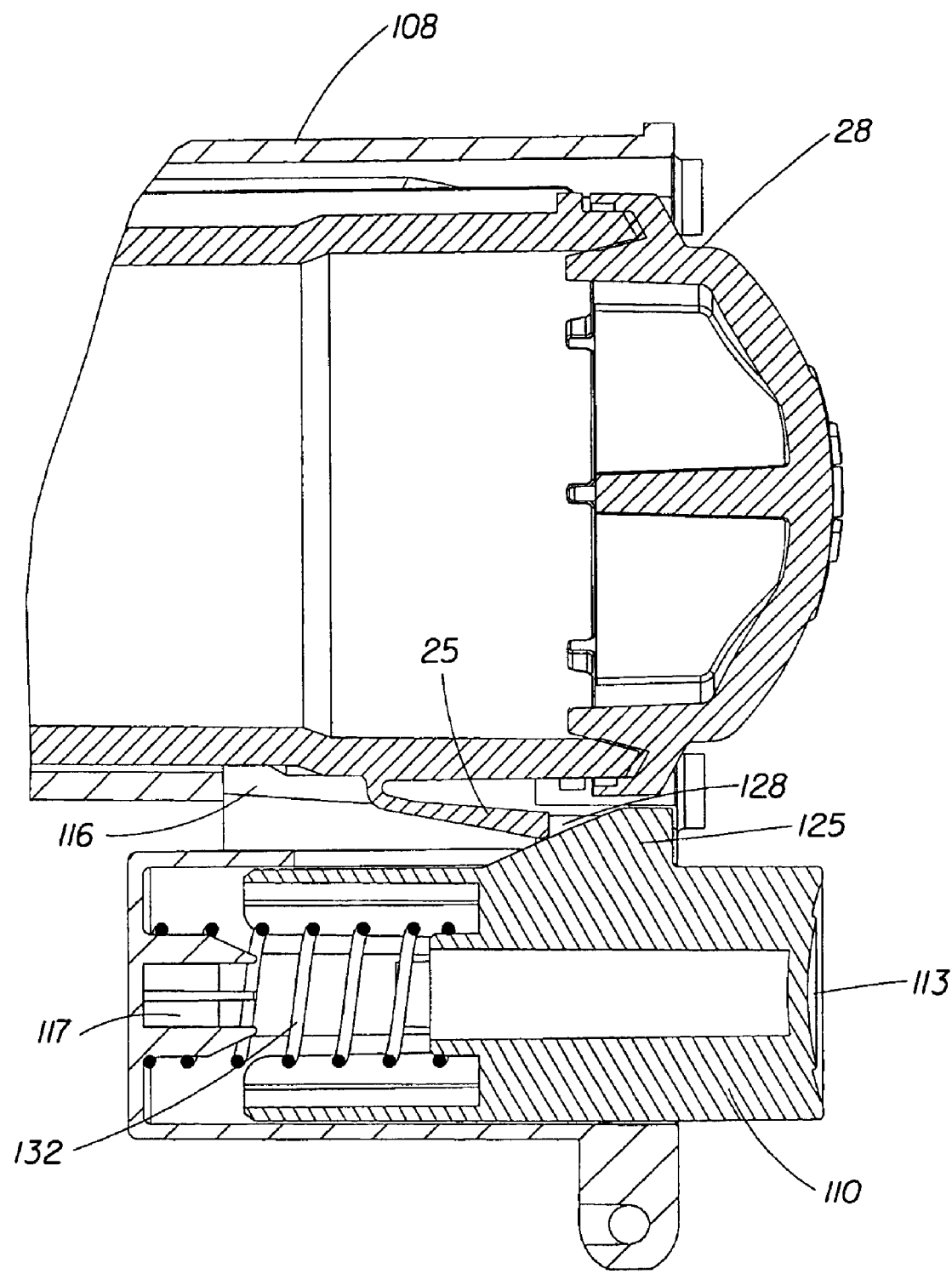
FIG. 17 is a cross sectional top view of the cartridge of FIG. 14-A taken along the line 17-17 thereof, wherein the cartridge is fully inserted into the appliance casing with the appliance button in a closed position.

The appliance of the preferred embodiment will now be generally described. Referring to FIGS. 14-A, 14-B, 15-A, 15-B, 16-A, 16-B, and 17, the refrigerator contains a cylindrical casing 108 having a first end 107 and a second end (70109, shown in FIG. 19). The casing 108 is approximately the length of the cartridge 20, and the inner diameter of the casing 108 is approximately the same as the outer diameter of the cartridge 20, not including the rails 31 or the latch 25. Both the latch 25 and the rails 31 extend beyond the outer diameter of the cartridge 20. The second end (70109, shown in FIG. 19) of the casing 108 mounts to the head assembly 22 such that the head assembly 22 acts to close the second end (70109, shown in FIG. 19) of the casing 108 in such a way that the opening 58 of the retainer 56, as well as the open ends 118 and 120 of the inlet and outlet receiving port housings 48 and 50 are contained within the appliance casing 108. The open end 107 is of a diameter to receive the cartridge 20, when the cartridge guide rails 31 are aligned with a guide rail impression 114 at the first end 107 within the casing 108. The guide rail impression 114 is approximately the length, width, and depth of the two guide rails 31. Opposite the guide rail impression 114, the casing 108 has an open slot 116 capable of receiving the cartridge latch 25. The open slot 116 is located inside the open end 107 such that a lip 128 is formed, as shown in FIG. 17. The open slot 116 is approximately the length, width, and slightly less in depth than the biased latch 25. Adjacent the open end 107, running parallel with a longitudinal axis 105 of the casing 108, a cylindrical button housing 115 is part of and in physical contact with the cylindrical casing 108 of the appliance.

Figure 15A:
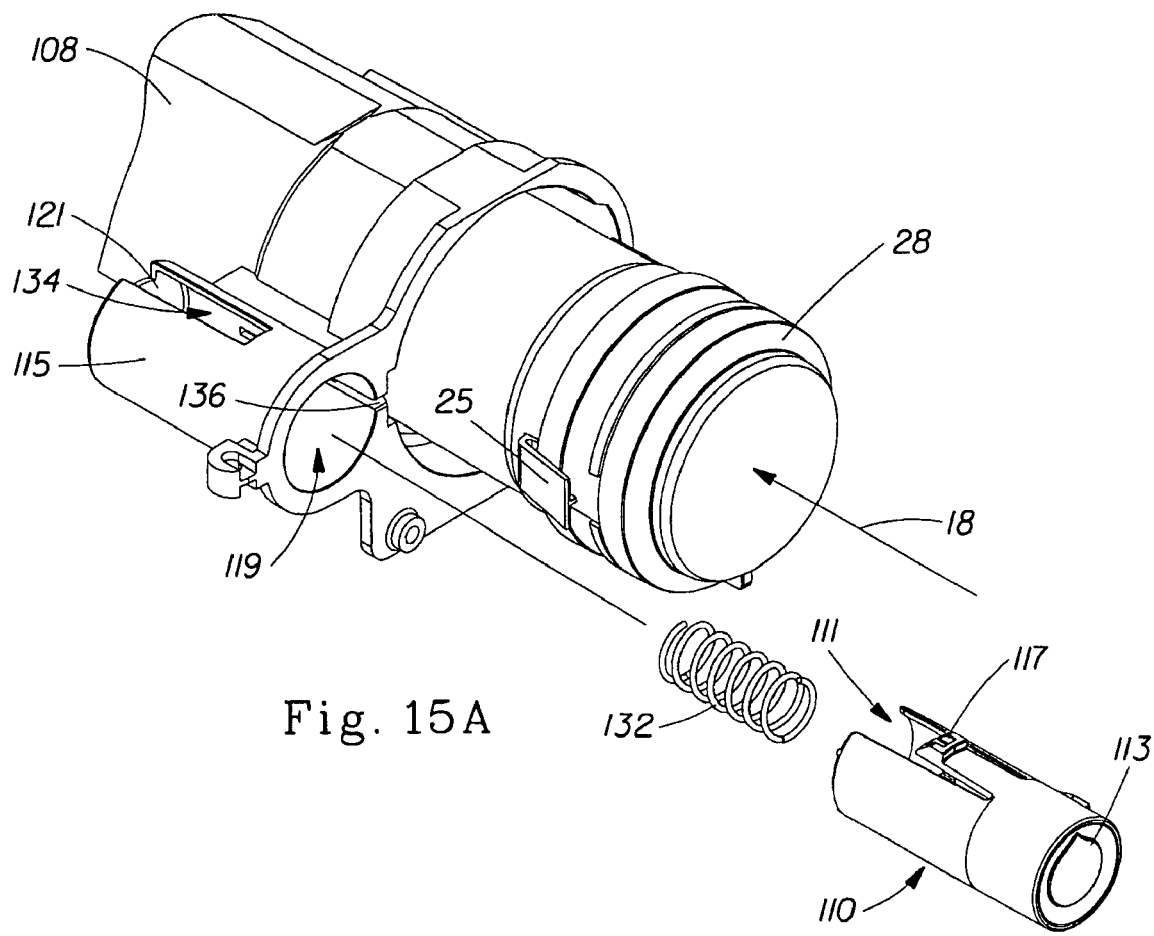
FIG. 15-A is an exploded perspective view of the appliance button of FIG. 14-B for unlatching the cartridge.
Figure 15B:
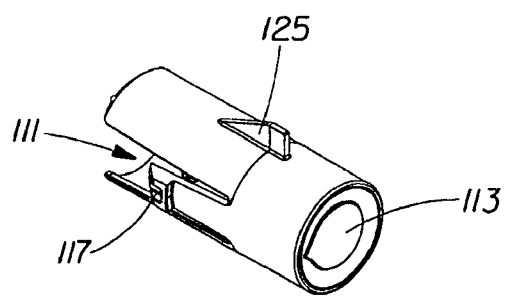
Figure 16A:
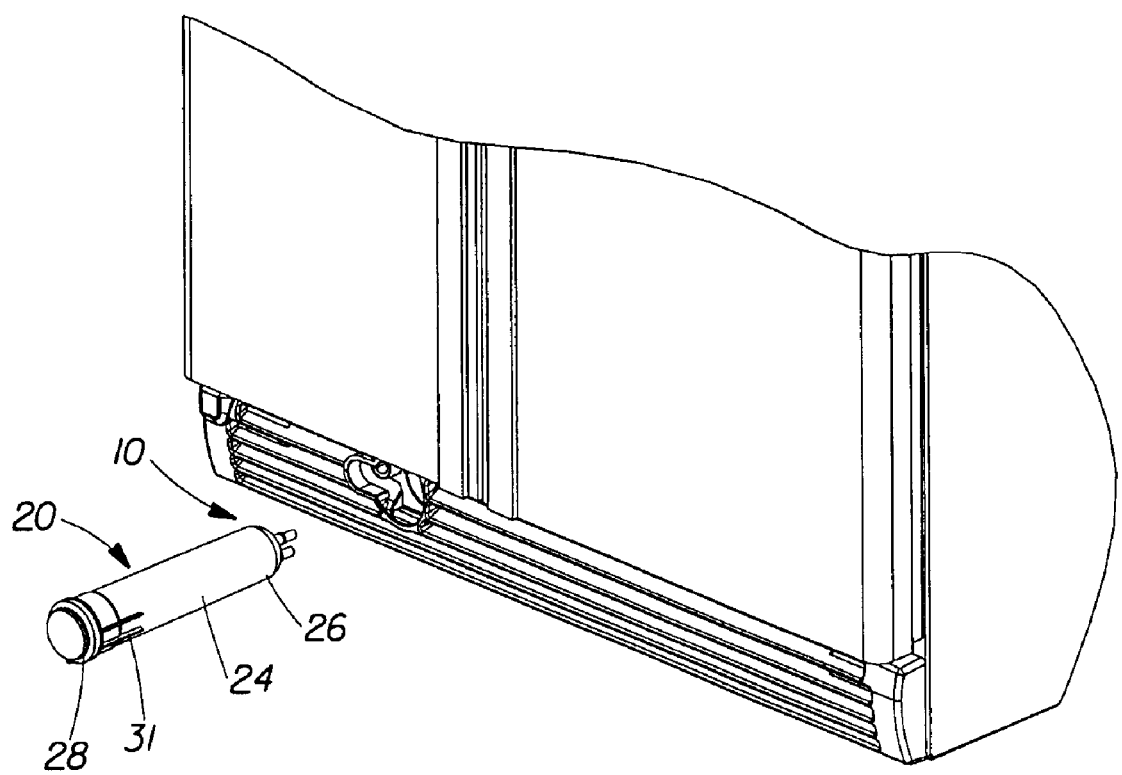
FIG. 16-A is a perspective view of the cartridge of FIG. 1 prior to insertion the head assembly of FIG. 1 which is positioned behind the front grill of a refrigerator.
Figure 16B:
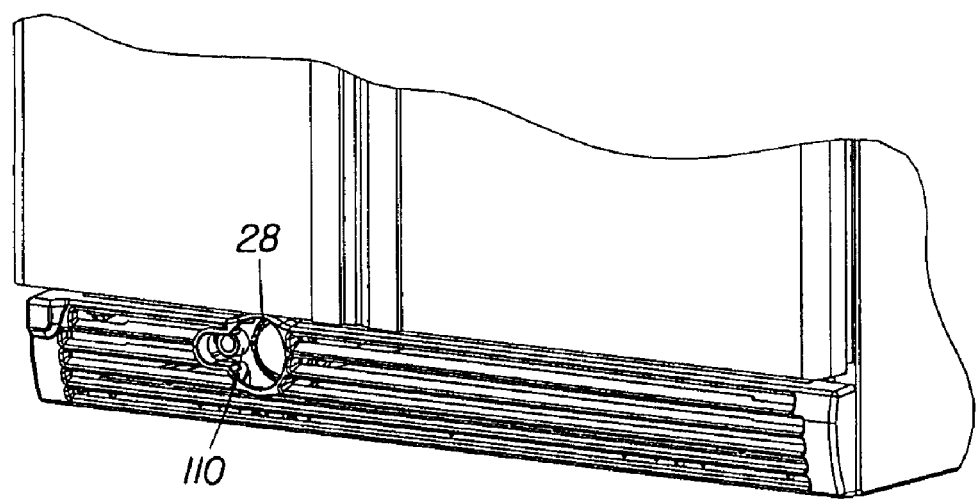

As shown in FIGS. 15-A and 15-B, the button housing 115 has an open and closed end 119 and 121. The housing 115 also has two wide guide slots 134 opposite each other, and a narrow guide slot 136. The narrow guide slot 136 is in communication with the open slot 116 of the casing 108. The button housing 115 is of a diameter to receive a cylindrical button 110 having an open and closed end 111 and 113. The button 110 has two retaining latches 117 opposite each other and an angled wall 125 extending from its outer surface. The wide guide slots 134 are positioned to receive the retaining latches 117 and the narrow guide slot 136 is positioned to receive the angled wall 125. The button 110 is biased to a latching position by a spring 132. More specifically, the spring biases the retaining latches 117 against the guide slots 134, which keep the button 110 seated in the button housing 115. The button 110 may be moved to an unlatching position by pushing, with one's fingers, the closed end 113 of the button 110 until the open end 111 contacts the closed end 121 of the button housing 115 such that the retaining latches 117 slide within the guide slots 134 and the angled wall 125 slides along the narrow guide slot 136.

When the first end 26 of the cartridge 20 is inserted into the first end 107 of the appliance casing 108, the guide rails 31 must be aligned for the cartridge 20 to fit into the casing 108 completely so as to allow the inlet and outlet fittings 30 and 32 and the protrusion 33 to actuate the inlet and outlet valves 42 and 44 and the bypass valve 52. While the cartridge 20 is being inserted, the outwardly biased latch 25 is biased against the cartridge 20. However, at the point of insertion where the valves 42, 44, and 52 are being actuated, the cartridge latch 25 meets the casing slot 116 and resumes being sprung such that the lip 128 retains the cartridge 20 via the latch 25. Thus, the cartridge 20 cannot be removed without biasing the latch 25 toward the cartridge 20 such that the latch 25 clears the lip 128. This is accomplished by pushing the button 110 to an unlatching position which causes the angled wall 125 to contact the latch 25 such that the latch 25 is biased toward the cartridge 20 to a point of clearing the lip 128, thus allowing the cartridge 20 to be removed, causing the valves 42, 44, and 52 to be unactuated. Once the button 110 is pushed to an unlatched position, the cartridge 20 may be removed manually by a person. Alternatively, the cartridge 20 may be partially ejected by the pressure of the inlet and outlet valves 42 and 44, by pressurized fluid escaping from the inlet and outlet fittings 30 and 32, or by a spring(s) (not shown) seated in the head assembly 22.

Figure 18A:
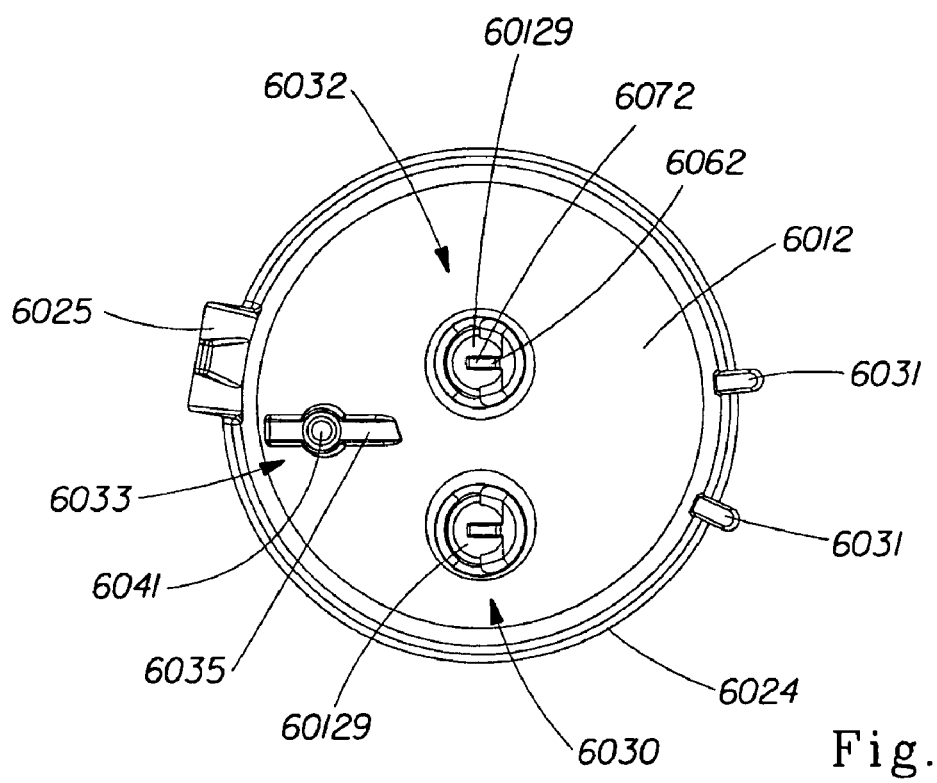
FIG. 18-A is a front elevational view of an alternate embodiment of the cartridge of FIG. 1, wherein the position of the fittings and protrusion is altered, and the fittings further include a deflector wall.
Figure 18B:
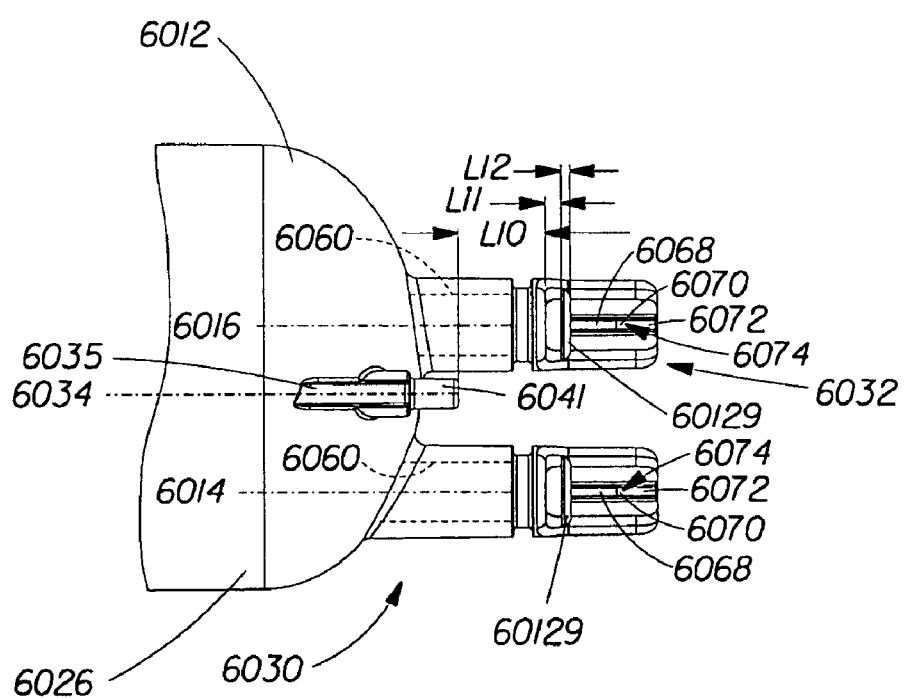
Figure 18C:
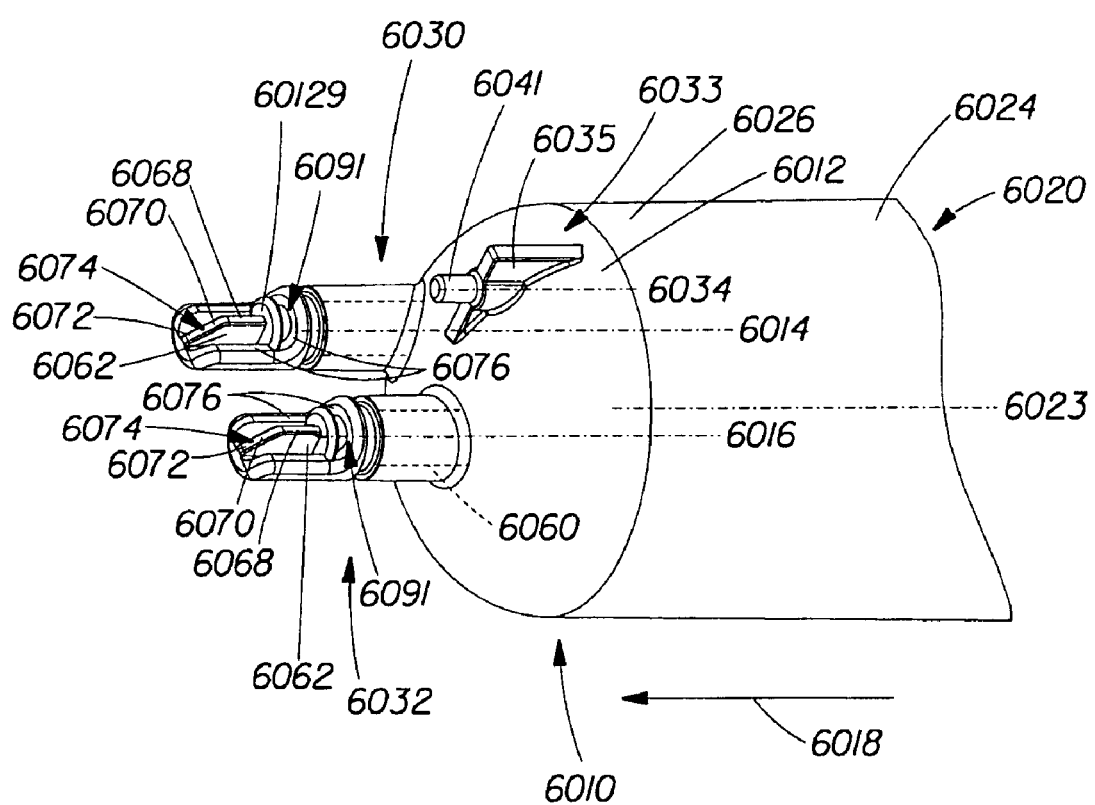

Depending on the desired rate and degree of ejection, and other such factors including water pressure, trapped air within the cartridge 20, etc. it is anticipated that additional elements may be used in order to control ejection of the cartridge 20. For instance, as shown in FIGS. 18-A, 18-B, and 18-C, it is anticipated that the inlet fitting 6030 may include a deflector wall 60129 (preferably having a length from about 0.04 cm, about 0.06 cm, about 0.08 cm to about 0.2 cm, about 0.5 cm, about 1 cm, and preferably having a height from about 0.2 cm, about 0.4 cm, about 0.6 cm to about 1.5 cm, about 2 cm, about 3 cm, and preferably having a width from about 0.2 cm, about 0.4 cm, about 0.6 cm to about 1.5 cm, about 2 cm, about 3 cm) which functions to direct escaping fluid from the inlet and outlet fittings 6030 and 6032, and more particularly, from the opening 6091 of the channel 6060, in a direction perpendicular to the line of cartridge 6020 (partially shown) insertion 6018. Thus, upon cartridge 6020 (partially shown) ejection, most all of the emitted water from the opening 6091 will first hit the inside side portion of receiving port housings 6048 and 6050 instead of the inside back portion of port housings 6048 and 6050 (as it would in the above-described preferred embodiment), which will act to diminish the contribution of emitting water to ejection of the cartridge 6020 (partially shown). The deflector wall 60129 may extend away from the inside portion of fittings 6030 and 6032 in a direction perpendicular to the longitudinal axis 6014 of the inlet fitting 6030, and positioned perpendicular to and at the most proximal end of the actuation wall 6062. The most distal portion of the protrusion end 6041 to the most proximal portion of the deflector wall 60129 is preferably a distance (L10 through L11) from about 0.5 cm, about 1 cm, about 1.5 cm to about 3 cm, about 3.5 cm, about 4 cm, and the most distal portion of the protrusion end 6041 to the most distal portion of the deflector wall 60129 is preferably a distance (L10 through L12) from about 0.5 cm, about 1 cm, about 1.5 cm to about 3.5 cm, about 4 cm, about 4.5 cm. The most proximal portion of the open portion 6076 to the most proximal portion of the deflector wall 60129 is preferably a distance (L11) from about 0.05 cm, about 0.1 cm, about 0.15 cm to about 0.5 cm, about 1 cm, about 1.5 cm and the most proximal portion of the open portion 6076 to the most distal portion of the deflector wall 60129 is preferably a distance (L11 through L12) from about 0.05 cm, about 0.1 cm, about 0.15 cm to about 0.5 cm, about 1 cm, about 1.5 cm. FIGS. 18-A, 18-B, and 18-C also illustrate, as mentioned above, slightly modified positioning of the protrusion 6033, protrusion end 6041, and support bridge 6035, as well as the inlet 6030 and outlet 6032. The actuation wall 6062 has also been shortened in length to accommodate the deflector wall 60129. It should be noted that these modifications, consistent with the above description of the preferred embodiment, maintain positioning of the protrusion 6033 between the inlet fitting 6030 and the outlet fitting 6032.

As shown in FIG. 19, it is also anticipated that cartridge (e.g., 20) ejection may be controlled by a friction spring 70130 which acts to cause friction on the outside of a cartridge housing (e.g., 24) such that the ejection of a cartridge (e.g., 20) is slowed by such friction. The friction spring 70130 may be fixed to the inside of the appliance casing 70108 such that at least a portion of the friction spring 70130 is biased to contact a cartridge housing (e.g., 24) upon insertion of a cartridge (e.g., 20). It is apparent that the degree of bias, and thus the force to overcome the friction spring 70130, as well as the area of spring 70130 contact may be adjusted as desired. Upon insertion of a cartridge (e.g., 20), the friction spring 70130 is designed to give to the shape of a cartridge (e.g., 20) when the desired force of insertion is applied. When a cartridge (e.g., 20) is ejected, the friction caused by the portion of the biased spring 70130 contacting a cartridge housing (e.g., 24) will act to slow a cartridge (e.g., 20) as it is ejected. In FIG. 19, the friction spring 70130 is fixed between the guide rail impression 70114 at the first end 70107 within the casing 70108 such that spring 70130 friction will occur between guide rails (e.g., 31) of a cartridge housing (e.g., 24). Alternatively, a friction spring (e.g., 70130) may be made part of a cartridge housing (e.g., 24) such that fiction occurs between a friction spring (e.g., 70130) and the inside of an appliance casing (e.g., 70108) for the purpose of slowing cartridge (e.g., 20) ejection. When a friction spring (e.g., 70130) is placed within the casing 70108, a friction spring (e.g., 70130) can be used to bias a cartridge (e.g., 20) toward a lip (e.g., 128) such that a latch (e.g., 25) of a cartridge (e.g., 20) need not have an outward bias, but rather may be fixed or rigid, and or solid. Whether the friction spring 70130 is placed on a cartridge (e.g., 20) or in the appliance casing 70108, the spring's 70130 particular placement is dependent on the goals and desires of the designer. FIG. 19 also illustrates, as mentioned above, slightly modified positioning of the inlet and outlet passageway housings 7038 and 7040, such that the two passageway housings 7038 and 7040 are extend the same distance from the head assembly 7022.

Figure 20:
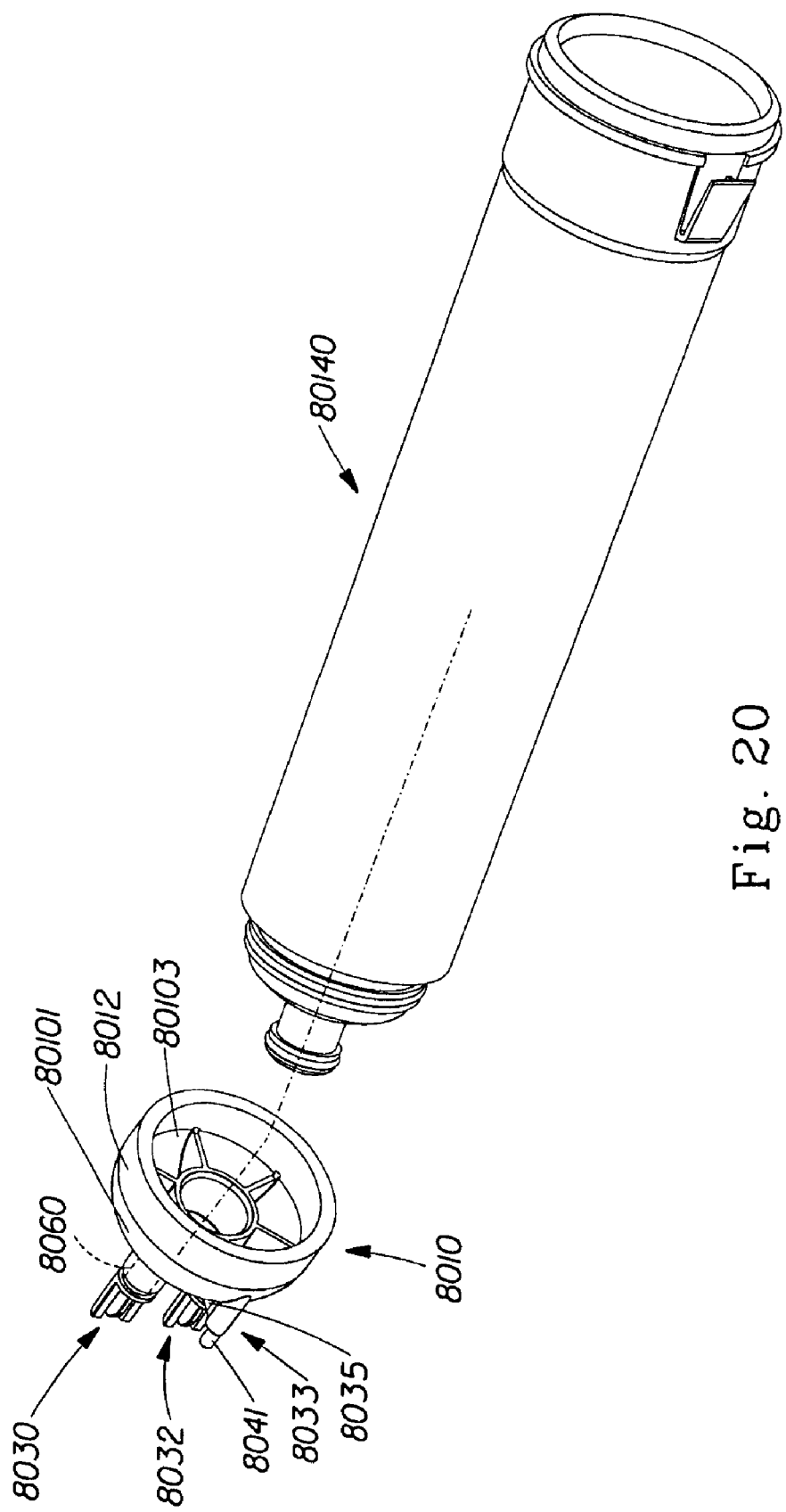
FIG. 20 is an exploded perspective view of an alternative embodiment of the end piece of the cartridge of FIG. 1 and a separate cartridge.

While the end piece 10 is connected to the cartridge 20 in the preferred embodiment, it is anticipated, as shown in FIG. 20, that the end piece 8010 may be without its own cartridge (e.g., 20). That is, the end piece 8010 may be connected to an already existing cartridge (e.g., 80140) so that the end piece 8010 functions as an adapter for the existing cartridge 80140. The connection may be a removable or permanent, including, but not limited to molding, soldering, latching, adhesively bonding, friction fitting, threading, screwing, welding, snap-fitting, etc. Further, connection includes situations where the end piece 8010 receives a cartridge, or is received by a cartridge, or a combination of both. Still further, the connection of the end piece 10 to a cartridge (e.g., 80140) may be interrupted by additional interfaces, and still be within the meaning of connected. That is, the fluid communication between the end piece 8010 and a cartridge (e.g., 80140) is within the meaning of connected as used herein. It is within the scope of this invention to connect and use any cartridge in combination with the end piece 8010. For instance, as one of many possible illustrations, the end piece 8010 may have an end piece wall 8012 having a top surface 80101 and a bottom surface 80103, where the top surface 80101 includes one or more fittings (e.g., 8030 and 8032) or protrusions (e.g., 8033) and the bottom surface 80103 is capable of receiving or being received by a retro-fit-cartridge 80140 not capable of actuating valves (e.g., 42 and 44) so that fluid communication with a head assembly (e.g., 22) can be achieved in and of itself. Thus, the retrofit cartridge 80140 is only one example, and may vary greatly in shape, size, etc.

Figure 21:
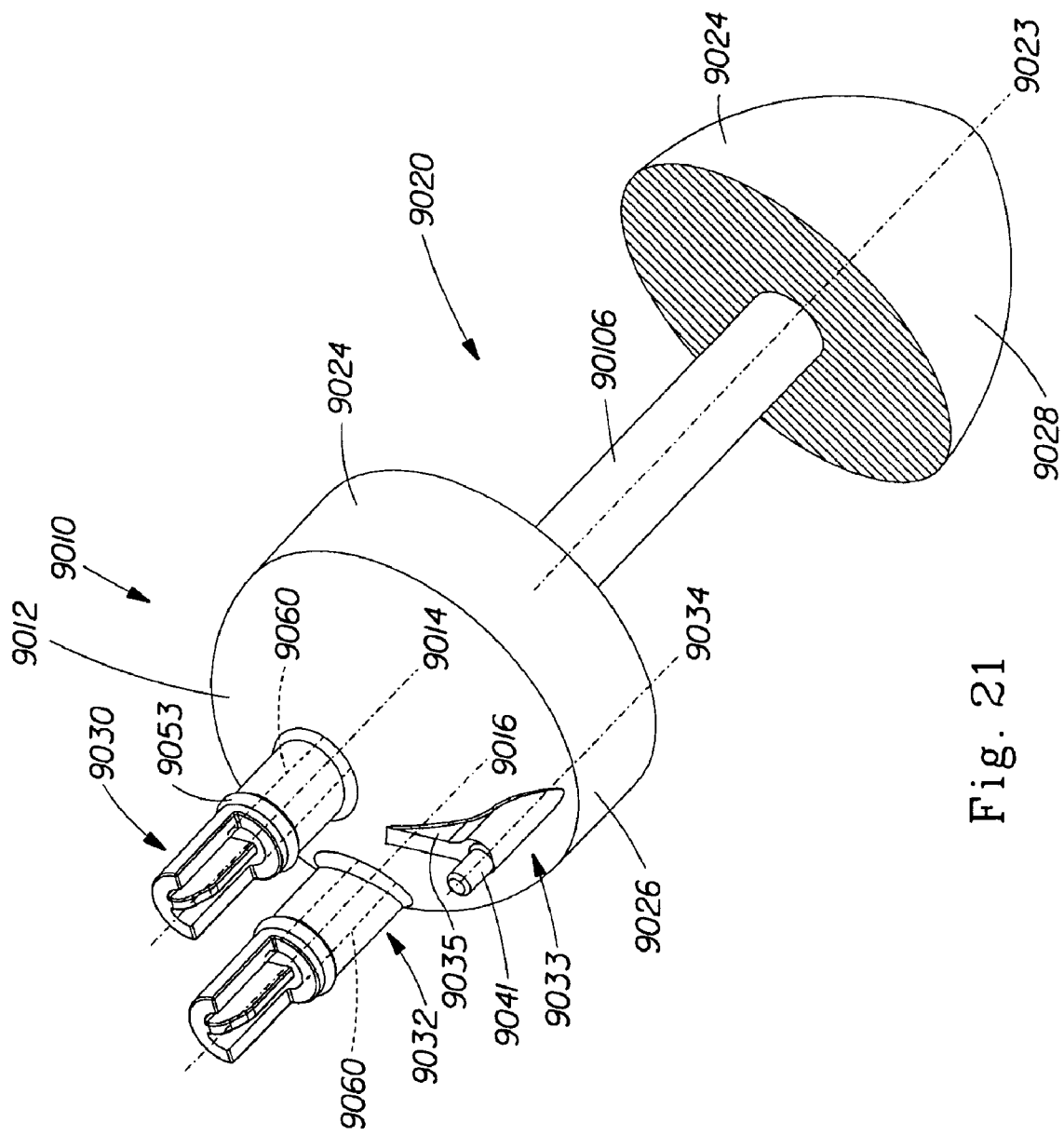
FIG. 21 is a perspective view of the end piece of the cartridge of FIG. 1 and of an alternative embodiment of the cartridge housing of the cartridge of FIG. 1 where the first and second ends of the cartridge housing are connected by a rod.

As shown in FIG. 21, it is anticipated that the cartridge housing 9024 may be other than cylindrical, while still having a longitudinal axis 9023. For instance, a hollow first end 9026 for containing treatment material (not shown) may be joined to a second end 9028 by a connecting rod 90106. The rod 90106 may or may not be in fluid communication with the first end 9026. The rod 90106 may or may not contain treatment material (not shown). Alternatively, the second end 9028 may be hollow for containing treatment material (not shown) and may be joined to the first end 9026 by a rod 90106 which is in fluid communication with the first end 9026. Thus, it is anticipated that any portion of the housing 9024 along the longitudinal axis 9023 of the cartridge 9020 may include a hollow portion for containing treatment material (not shown) in fluid communication with the end piece 9010.

Figure 22:
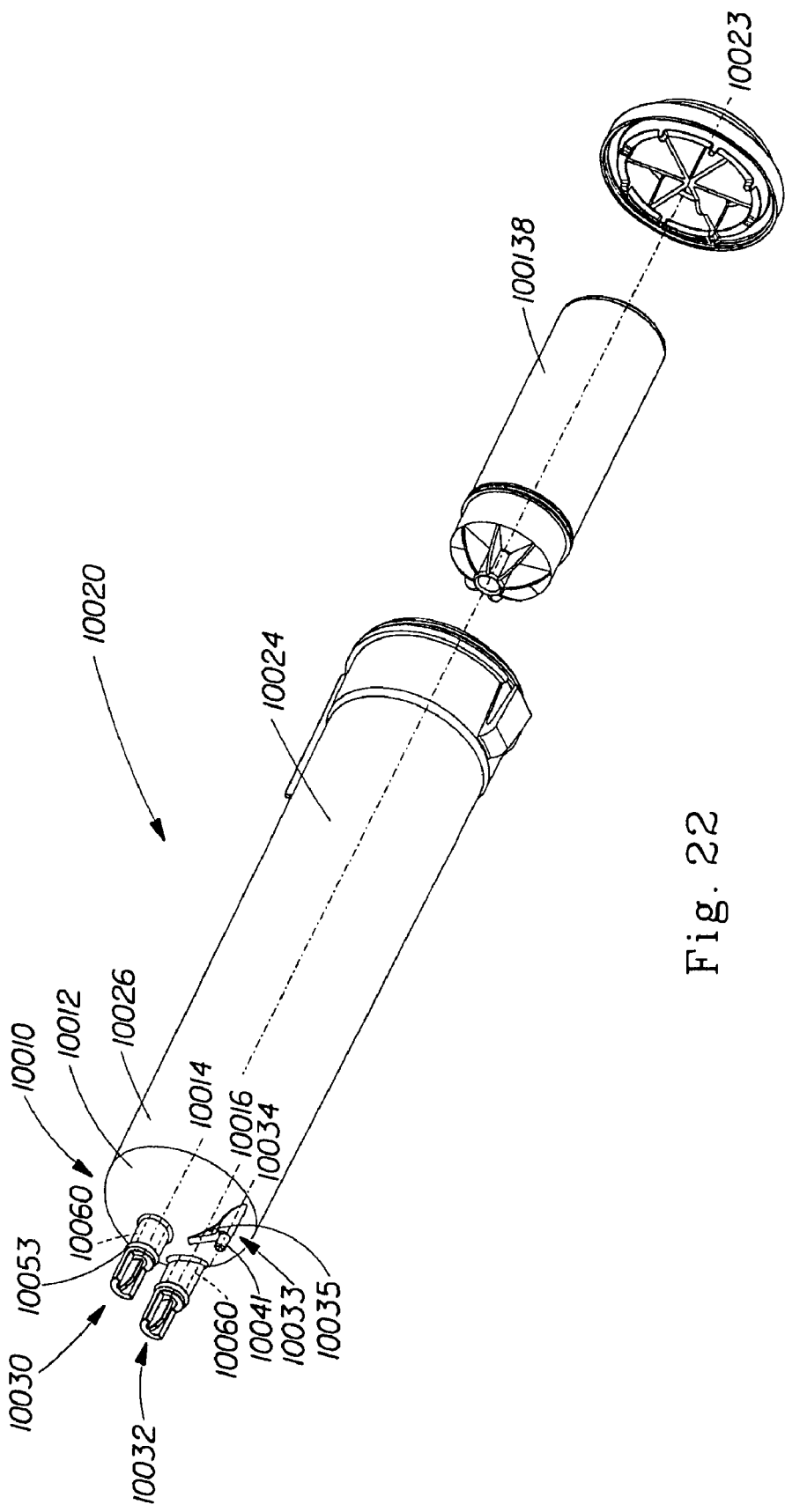
FIG. 22 is a perspective view of the end piece of the cartridge of FIG. 1 and an alternative embodiment of the cartridge housing of the cartridge of FIG. 1 containing an additional insertable cartridge.

As shown in FIG. 22, it is further anticipated that the cartridge 10020 may contain within its housing 10024 a second housing 100138 which contains treatment material. That is, it is within the scope of this invention to have connected housing 10024 (into which an already housed treatment material may be inserted into) in such a manner that the end piece 10010 is in fluid communication with the treatment material housed in the second housing 100138. In such an embodiment, it is anticipated that cartridge 10020 may or may not have its own treatment material.

All documents cited are, in relevant part, incorporated herein by reference. The citation of any document is not to be construed as an admission that it is prior art with respect to the present invention.

What is claimed is:

1. A water treatment cartridge for operatively engaging a head assembly, the head assembly comprising one or more valves, for the treatment and control of fluid passing through the head assembly, said cartridge comprising:

A. an end piece, said end piece comprising
   i. an end piece wall;
   ii. an inlet fitting having a fluid channel running along a longitudinal axis of the inlet fitting and an actuating cam surface arranged in the fluid channel for actuating a valve in the head assembly;
   iii. an outlet fitting having a cam surface for actuating a valve in the head assembly, said outlet fitting having a longitudinal axis; and
   iv. a protrusion having a longitudinal axis for actuating said one or more valves;
   wherein said inlet fitting, said outlet fitting, and said protrusion extend from said end piece wall; and B. a water treatment cartridge housing having a first end, a closed second end, and a longitudinal axis extending therebetween, said cartridge housing comprising a water treatment material in fluid communication with said inlet and said outlet fittings;
   wherein said end piece wall is connected to said first end of said cartridge housing, and wherein a portion of said cam surface of said inlet fitting is vectored from at least one of said longitudinal axis of said inlet fitting, said longitudinal axis of said outlet fitting, and said longitudinal axis of said cartridge housing, and wherein a portion of said cam surface of said outlet fitting is vectored from at least one of said longitudinal axis of said inlet fitting, said longitudinal axis of said outlet fitting, and said longitudinal axis of said cartridge housing.

2. A unit for use in the treatment of fluid, said unit comprising
  A. an end piece, said end piece comprising
    i. an end piece wall;
    ii. an inlet fitting having a fluid channel running along a longitudinal axis of the inlet fitting and an actuating cam surface arranged in the fluid channel distal a sealing surface for actuating an inlet valve, said inlet valve having a follower disposed orthogonal to said longitudrnal axis;
    iii. an outlet fitting for actuating an outlet valve, said outlet fitting having a sealing surface and a longitudinal axis;
    wherein said inlet fitting and said outlet fitting extend from said end piece wall, and wherein a portion of said cam surface of said inlet fitting is vectored from at least one of said longitudinal axis of said inlet fitting and said longitudinal axis of said outlet fitting; and
  B. a head assembly, said assembly comprising
    i. an inlet receiving port housing for receiving said inlet fitting, said inlet receiving port housing containing at least a portion of said follower of said inlet valve; and
    ii. an outlet receiving port housing for receiving said outlet fitting;
    wherein said inlet and outlet receiving port housings are so arranged to receive said inlet and outlet fittings, respectively, and said inlet and outlet sealing surfaces seal between said inlet and outlet fittings and said inlet and outlet receiving port housings, respectively, and said follower of said inlet valve is actuated by said cam surface.

3. The unit of claim 2, wherein at least a portion of said cam surface is vectored between about 1 degree and about 90 degrees from said longitudinal axis of said inlet fitting.

4. The unit of claim 2, wherein at least a portion of said cam surface is angled between about 1 degree and about 90 degrees from said longitudinal axis of said inlet fitting.

5. The unit of claim 2, wherein said cam surface comprises an essentially straight surface.

6. The unit of claim 2, wherein said cam surface comprises an essentially curved surface.

7. The unit of claim 2, wherein said cam surface comprises a first essentially straight surface and a second essentially straight surface, each said surface being vectored from said longitudinal axis of said inlet fitting.

8. The unit of claim 7, wherein said first essentially straight surface is vectored about 45 degrees from said longitudinal axis of said inlet fitting and said second essentially straight surface is vectored about 90 degrees from said longitudinal axis of said inlet fitting.

9. The unit of claim 7, wherein at least one of said first essentially straight surface and said second essentially straight surface are angled in relation to said longitudinal axis of said inlet fitting.

10. The unit of claim 2, wherein said cam surface comprises an essentially curved surface and an essentially straight surface, each said surface being vectored from said longitudinal axis of said inlet fitting.

11. The unit of claim 10, wherein said essentially straight surface is vectored about 90 degrees from said longitudinal axis of said inlet fitting.

12. The unit of claim 10, wherein said essentially straight surface is angled in relation to said longitudinal axis of said inlet fitting.

13. The unit of claim 2, wherein said outlet fitting has a cam surface distal from the sealing surface, wherein a portion of said cam surface of said outlet fitting is vectored from at least one of said longitudinal axis of said outlet fitting or said longitudinal axis of said inlet fitting.

14. The unit of claim 2, further comprising a protrusion having a longitudinal axis, said protrusion extending from said end piece wall.

15. The unit of claim 14, wherein said protrusion is positioned between said inlet and said outlet fittings.

16. The unit of claim 15, wherein the distance from said longitudinal axis of said inlet to said a longitudinal axis of said outlet is less than the distance from said longitudinal axis of said inlet to said longitudinal axis of said protrusion, and wherein the distance from said inlet to said longitudinal axis of said protrusion is greater than the distance from said longitudinal axis of said outlet to said longitudinal axis of said protrusion.

17. The unit of claim 14, wherein the most distal portion of said protrusion is closer to said end piece wall than the most distal portions of said inlet and said outlet fittings.

18. The unit of claim 2, wherein said cam surface is positioned on a wall extending from the base of a channel of said inlet fitting.

19. The unit of claim 2, wherein said end piece is capable of being connected to a cartridge housing.

20. The unit of claim 2, wherein said outlet valve is actuated by pressure.

21. The unit of claim 2, wherein said outlet valve comprises a follower, and wherein said outlet receiving port housing contains at least a portion of a follower of said outlet valve, and wherein said outlet fitting further comprises a cam surface distal said sealing surface for actuating said follower of said outlet valve, and wherein a portion of said cam surface of said outlet fitting is vectored from at least one of said longitudinal axis of said inlet fitting and said longitudinal axis of said outlet fitting.

* * * * *

(12) EX PARTE REEXAMINATION CERTIFICATE (10061st)

United States Patent
Olson et al.

(10) Number: US 7,610,932 C1
(45) Certificate Issued: *Feb. 27, 2014

(54) FLUIDIC CARTRIDGES AND END PIECES THEREOF

(75) Inventors: Judd Dylan Olson, Minnetonka, MN (US); David James Emmons, Plymouth, MN (US); John Paul Boros, Maple Lake, MN (US); Donald Stephen Bretl, West Chester, OH (US); Alan Joseph Mitchell, Evansville, IN (US); Todd L. Rose, Evansville, IN (US)

(73) Assignee: Whirlpool Corporation, Benton Harbor, MI (US)

Reexamination Request:
No. 90/012,283, May 4, 2012

Reexamination Certificate for:
Patent No.: 7,610,932
Issued: Nov. 3, 2009
Appl. No.: 11/291,385
Filed: Dec. 1, 2005

( * ) Notice: This patent is subject to a terminal disclaimer.

Related U.S. Application Data

(63) Continuation of application No. 10/424,200, filed on Apr. 25, 200, now Pat. No. 7,000,894.

(51) Int. Cl.
*F16L 37/56* (2006.01)

(52) U.S. Cl.
USPC .................. 137/594; 251/149.1; 251/251

(58) Field of Classification Search
None
See application file for complete search history.

(56) References Cited

To view the complete listing of prior art documents cited during the proceeding for Reexamination Control Number 90/012,283, please refer to the USPTO's public Patent Application Information Retrieval (PAIR) system under the Display References tab.

*Primary Examiner* — Aaron J Lewis

(57) ABSTRACT

In the treatment of water, an end piece is connected to a treatment cartridge housing and inserted into an appliance having bypass, inlet, and outlet valves. The end piece has an end piece wall from which an inlet fitting, outlet fitting, and protrusion extend. The inlet fittings, outlet fittings, protrusion, and cartridge housing each have a longitudinal axis. The inlet and outlet fittings have a cam surface for actuating the inlet and outlet valves, respectively. Further, the cam surfaces of the inlet and outlet fittings are angled and vectored in relation to their respective longitudinal axis. The protrusion is shaped for actuating the bypass valve.

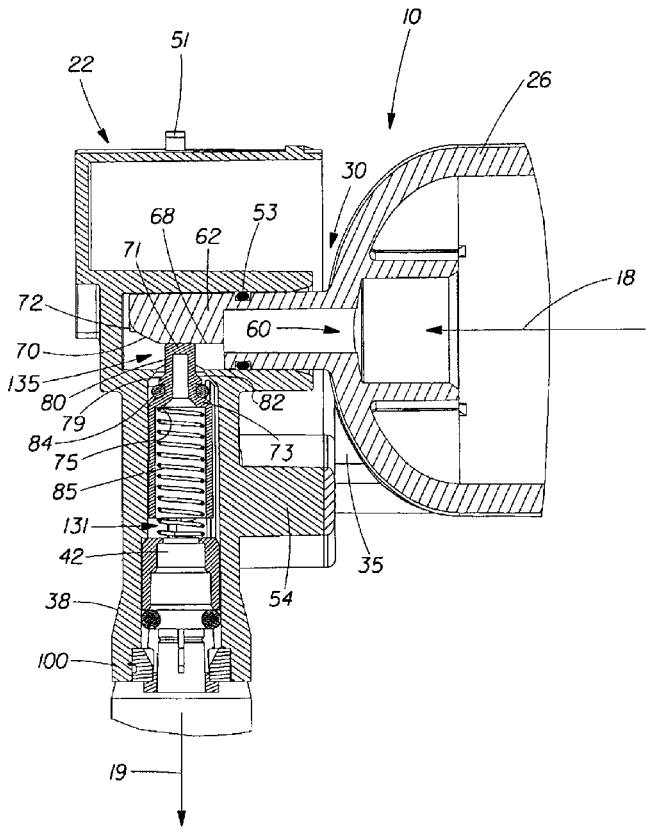

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-21 is confirmed.

\* \* \* \* \*